US012647304B2

(12) United States Patent
Ying

(10) Patent No.: US 12,647,304 B2
(45) Date of Patent: Jun. 2, 2026

(54) DYNAMIC IN-SITU ADAPTATION OF DATA INTERFACE

(71) Applicant: PARADE TECHNOLOGIES, LTD, San Jose, CA (US)

(72) Inventor: Canruo Ying, Santa Clara, CA (US)

(73) Assignee: PARADE TECHNOLOGIES, LTD, San Jose, CA (US)

( * ) Notice: Subject to any disclaimer, the term of this patent is extended or adjusted under 35 U.S.C. 154(b) by 109 days.

(21) Appl. No.: 18/317,926

(22) Filed: May 16, 2023

(65) Prior Publication Data

US 2024/0388474 A1 Nov. 21, 2024

(51) Int. Cl.
*H04L 25/03* (2006.01)

(52) U.S. Cl.
CPC .. *H04L 25/03057* (2013.01); *H04L 25/03038* (2013.01)

(58) Field of Classification Search
CPC ......... H04L 25/03057; H04L 25/03038; H04L 25/0272
See application file for complete search history.

(56) References Cited

U.S. PATENT DOCUMENTS 11,177,986 B1 * 11/2021 Ganesan ........... H04L 25/03878

* cited by examiner

*Primary Examiner* — David S Huang
(74) *Attorney, Agent, or Firm* — Morgan, Lewis & Bockius LLP

(57) ABSTRACT

This application is directed to adapting an electronic device in a data communication channel. The electronic device includes a sequence of modulation circuits, and each modulation circuit has one or more adjustable configurations. The sequence of modulation circuits obtains an input data signal and processes the input data signal to generate an output data signal including a first data sample. The electronic device determines a first residual error of the first data sample and adjusts a first adjustable configuration of a first modulation circuit based on the first residual error. A second adjustable configuration of a second modulation circuit is further adjusted based on the first adjustable configuration. In some implementations, the electronic device determines a first configuration error of the first adjustable configuration based on the first residual error, and adjusts the second adjustable configuration based on the first configuration error.

20 Claims, 12 Drawing Sheets

_1100_

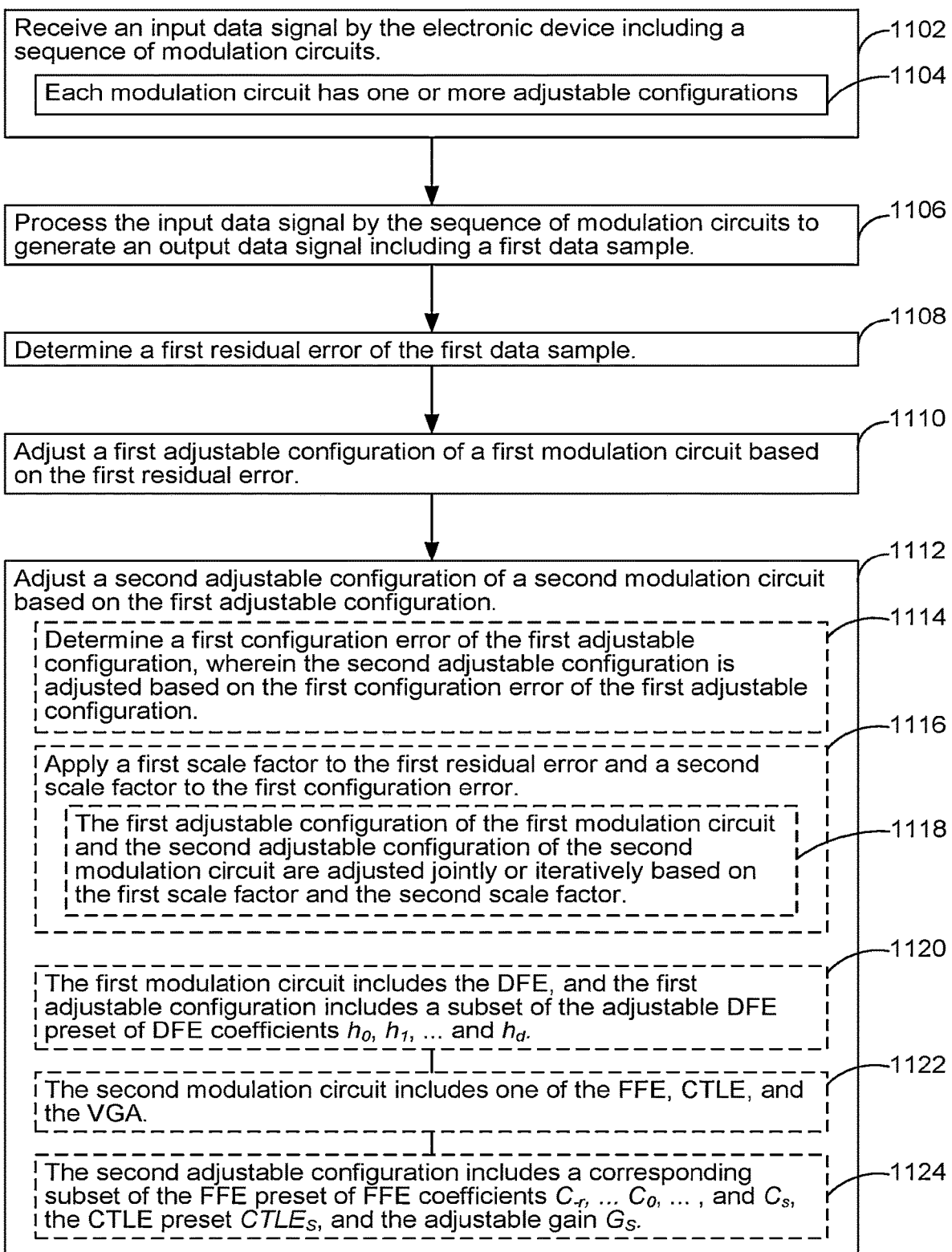

Receive an input data signal by the electronic device including a sequence of modulation circuits.                                                    ⟋1102

Each modulation circuit has one or more adjustable configurations                                                    ⟋1104

Process the input data signal by the sequence of modulation circuits to generate an output data signal including a first data sample.                                                    ⟋1106

Determine a first residual error of the first data sample.                                                    ⟋1108

Adjust a first adjustable configuration of a first modulation circuit based on the first residual error.                                                    ⟋1110

Adjust a second adjustable configuration of a second modulation circuit based on the first adjustable configuration.                                                    ⟋1112

Determine a first configuration error of the first adjustable configuration, wherein the second adjustable configuration is adjusted based on the first configuration error of the first adjustable configuration.                                                    ⟋1114

Apply a first scale factor to the first residual error and a second scale factor to the first configuration error.                                                    ⟋1116

The first adjustable configuration of the first modulation circuit and the second adjustable configuration of the second modulation circuit are adjusted jointly or iteratively based on the first scale factor and the second scale factor.                                                    ⟋1118

The first modulation circuit includes the DFE, and the first adjustable configuration includes a subset of the adjustable DFE preset of DFE coefficients $h_0$, $h_1$, ... and $h_d$.                                                    ⟋1120

The second modulation circuit includes one of the FFE, CTLE, and the VGA.                                                    ⟋1122

The second adjustable configuration includes a corresponding subset of the FFE preset of FFE coefficients $C_{-r}$, ... $C_0$, ... , and $C_s$, the CTLE preset $CTLE_s$, and the adjustable gain $G_s$.                                                    ⟋1124

Figure 11

DYNAMIC IN-SITU ADAPTATION OF DATA INTERFACE

TECHNICAL FIELD

The disclosed implementations relate generally to data transmission technology including, but not limited to, methods, systems, and devices for dynamically adapting modulation circuits of data interfaces in situ for different configurable settings in a high-speed data communication channel.

BACKGROUND

Many electronic devices are physically coupled to each other and communicate with each other using data links and interfaces that comply with high-speed serial computer expansion bus standards (e.g., Peripheral Component Interconnect (PCI) Express). These bus standards allow application of retimers and redrivers to extend a channel reach at a high data speed. A redriver is an analog extension device designed to boost portions of a signal to counteract attenuation caused by signal propagation over a physical interconnect of a corresponding data link. A retimer is a mixed-signal device that is standard-aware and has an ability to fully recover the data, extract the embedded clock, and retransmit a fresh copy of the data using a clean clock. Compared with the redriver, the retimer actively participates in applying the bus standard to implement negotiation, timeouts, bit manipulation, jitter resetting, signal equalization, skew correction, and many other functions. Multiple equalizers are oftentimes applied concurrently in the retimer, and however, can easily interfere with each other and lead to instability and non-convergence. Due to different principles of operation, different equalizers demonstrate different loop bandwidths and rates of convergence. Operating conditions also create additional constraints on an equalizer adaptation process. For example, certain data communication protocols require link training to be completed within a time period that is insufficiently long and limits a convergence rate of an adaptive equalizer. Additionally, configurability is often required for these equalizers due to different reasons (e.g., power saving). It would be beneficial to apply highly configurable and robust equalization mechanisms in a high speed data link or interface having a plethora of operating conditions.

SUMMARY

This application is directed to methods, electronic systems, electronic devices, electronic circuits, data links, data ports, and data interfaces that dynamically adapt modulation circuits of data interfaces in situ for different configurable settings in a high-speed data communication channel. High speed communication integrated circuits (ICs) in today's world are becoming increasingly more complex due to high data rates required by applications such as high resolution displays and high speed data transfer. Different types of equalizers have been developed to address various signal integrity issues that appear as data rates grow. A major source of data-dependent noise called inter-symbol interference (ISI) arises when data is transmitted across a transmission line, and leads to low signal-to-noise ratio (SNR) and high bit error rate (BER) unless adequate equalization is used. Example electronic devices applied for signal equalization include, but are not limited to, continuous-time linear equalizer (CTLE), decision feedback equalizer (DFE), and feed-forward equalizer (FFE). These equalizers are applied jointly with a variable gain amplifier (VGA) to improve the SNR. As such, settings of the CTLE, DFE, FFE and VGA are adjusted concurrently, dynamically, iteratively, and in situ according to different operating conditions (e.g., data rates, protocol standards, cable types, ambient temperatures).

In one aspect, a method is implemented at an electronic device for adapting a data communication channel. The method includes obtaining an input data signal by the electronic device including a sequence of modulation circuits. Each of the modulation circuits has one or more adjustable configurations. The method further includes processing the input data signal by the sequence of modulation circuits to generate an output data signal including a first data sample. The method further includes determining a first residual error of the first data sample, adjusting a first adjustable configuration of a first modulation circuit based on the first residual error, and adjusting a second adjustable configuration of a second modulation circuit based on the first adjustable configuration. In some implementations, the first adjustable configuration of the first modulation circuit and the second adjustable configuration of the second modulation circuit are adjusted dynamically, jointly, or iteratively.

In some implementations, adjusting the second adjustable configuration further includes determining a first configuration error of the first adjustable configuration. The second adjustable configuration is adjusted based on the first configuration error of the first adjustable configuration. Further, in some implementations, the method further includes applying a first scale factor to the first residual error and a second scale factor to the first configuration error and adjusting the first scale factor and the second scale factor to adjust the first adjustable configuration of the first modulation circuit and the second adjustable configuration of the second modulation circuit jointly or iteratively.

In another aspect, a non-transitory computer-readable storage medium stores one or more programs to be executed by one or more processors. The one or more programs include instructions for implementing any of the above methods for adapting an electronic device in a data interface or a data communication channel.

In yet another aspect, an electronic device includes a sequence of modulation circuits each of which has one or more adjustable configurations, an adaptive equalizer controller coupled to the sequence of modulation circuits, and memory storing one or more programs configured for execution by the adaptive equalizer controller and the sequence of modulation circuits. The one or more programs include instructions for implementing any of the above methods for adapting a data interface or a data communication channel.

In yet another aspect, an electronic device includes a sequence of modulation circuits and an adaptive equalizer controller. The sequence of modulation circuits is configured to obtain an input data signal and process the input data signal to generate an output data signal including a first data sample. Each modulation circuit has one or more adjustable configurations. The adaptive equalizer controller is coupled to the sequence of modulation circuits, and configured for determining a first residual error of the first data sample, adjusting a first adjustable configuration of a first modulation circuit based on the first residual error, and adjusting a second adjustable configuration of a second modulation circuit based on the first adjustable configuration.

These illustrative implementations are mentioned not to limit or define the disclosure, but to provide examples to aid understanding thereof. Additional implementations are discussed in the Detailed Description, and further description is provided there.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIG. 11 is a flow diagram of an example method for in-situ adaptation of an electronic device in a data channel, in accordance with some implementations.

Like reference numerals refer to corresponding parts throughout the several views of the drawings.

DESCRIPTION OF IMPLEMENTATIONS

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Figure 1:
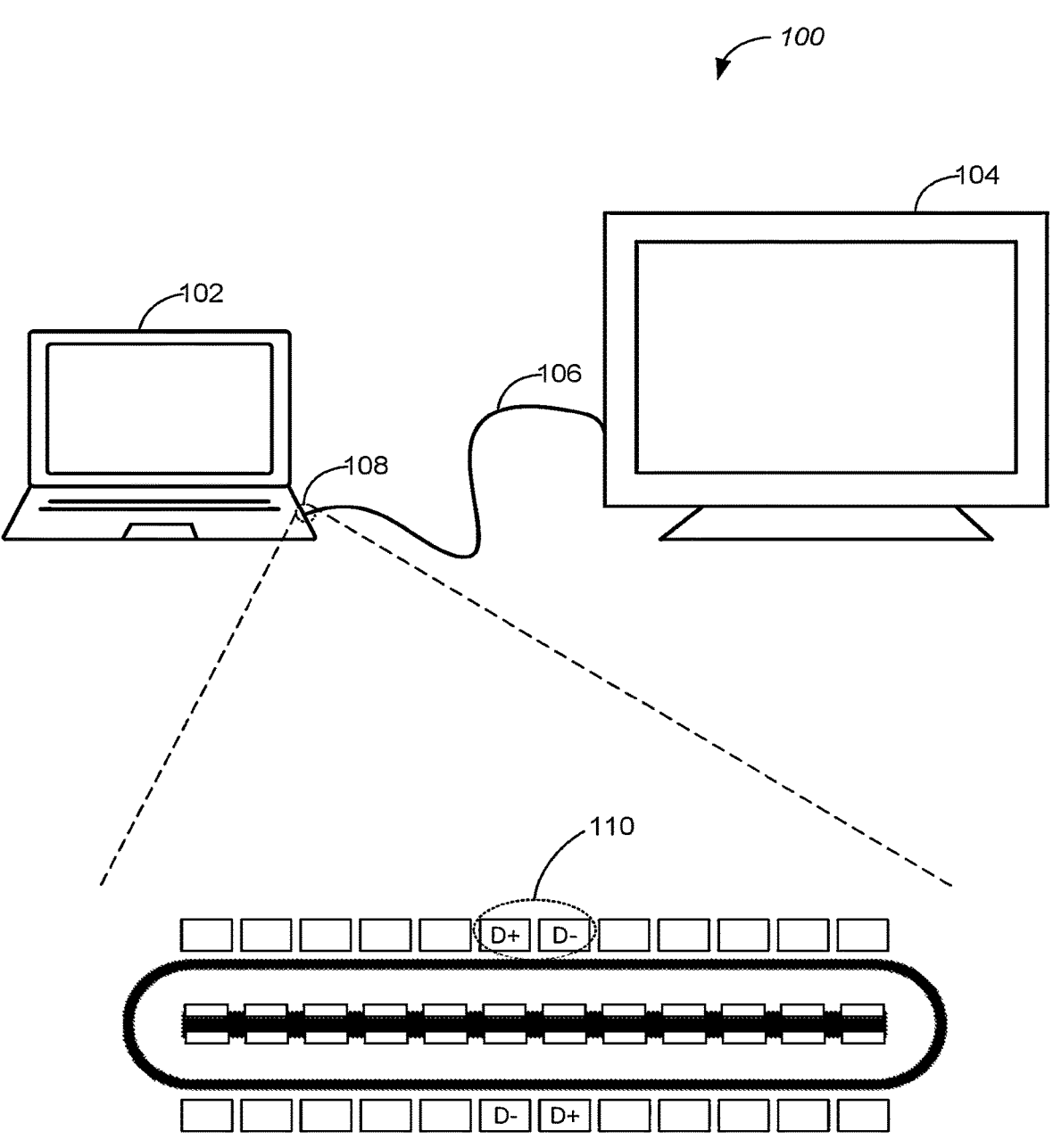
FIG. 1 is a block diagram of an example electronic system in which electronic devices are electrically via a data link, in accordance with some implementations.

FIG. 1 is a block diagram of an example electronic system 100 in which a first electronic device 102 is electrically coupled to a second electronic device 104 via a data link 106, in accordance with some implementations. The first electronic device 102 and second electronic device 104 are configured to exchange data via the data link 106. In an example, the first electronic device 102 includes a video source, and the second electronic device 104 includes a display device. The display device has a screen configured to display visual content provided by the first electronic device 102 via the data link 106. In another example not shown, the first electronic device 102 includes a desktop computer, and the second electronic device 104 includes a mobile phone that exchanges data with the desktop computer via the data link 106. Examples of the electronic devices 102 and 104 include, but are not limited to, a desktop computer, a laptop computer, a tablet computer, a video player, a camera device, a gameplayer device, or other formats of electronic devices which are configured to provide data or receive data. Video data, audio data, text, program data, control data, configuration data, or any other data are transmitted between the first and second electronic devices 102 and 104 via the data link 106.

The data link 106 includes two connectors 108 at two of its ends. The two connectors 108 are configured to connect the data link 106 to respective connectors 108 of the first electronic device 102 and second electronic device 104. For example, the connector 108 is a DisplayPort connector having a digital display interface developed by a consortium of personal computer and chip manufacturers and standardized by the Video Electronics Standards Association (VESA). The DisplayPort connector is configured to connect the data link 106 to the first electronic device 102 and carry video, audio, and control data according to a data communication protocol. In another example, the connector 108 is a universal serial bus (USB) connector, e.g., configured to connect a computer to a peripheral device. Exemplary types of the USB connector include, but are not limited to, USB-A, USB-B, USB-C. USB Micro-A, USB Micro-B, USB Mini-B, USB 3.0A, USB 3.0B, USB 3.0 Micro B, and USB Micro-AB. Further, a data communication protocol of USB4 is applied to communicate data using a USB-C connector, thereby providing a throughput of up to 40 Gbps, power delivery of up to 100 W, support for 4K and 5K displays, and backward compatibility with USB 3.2 and USB 2.

In some implementations, the connector 108 includes a bidirectional channel for communicating a stream of data between the first and second electronic device 102 and 104. The bidirectional channel of the connector 108 includes two data lanes and a pair of differential pins 110 coupled to the two data lanes. The pair of differential pins 110 are configured to receive a differential input signal from the first electronic device 102 or the second electronic device 104, and the differential input signal carries a serial data command or serial content data (e.g., video or audio data) that are communicated via the two data lanes of the connector 108. As such, the two data lanes and pair of differential pins 110 of the connector 108 are configured to facilitate bidirectional communication between the first electronic device 102 and the second electronic device 104. The bidirectional channel is a data channel or an auxiliary channel. Specifically, the auxiliary channel of the connector 108 is used for communication of additional serial data beyond video and audio data, such as consumer electronics control (CEC) commands. In some implementations, the pair of differential pins 110 is coupled to a dedicated set of twisted-pair wires configured to carry two input signals of the differential input signal.

Each connector 108 of the data link 106 is configured to be coupled to a respective connector 108 of the first electronic device 102 and a respective connector 108 of the second electronic device 104. Each connector 108 of the data link 106 is bidirectional, so is each respective connector 108 of the electronic devices 102 and 104. When the connector 108 of the data link 106 is coupled to the first or second electronic device 102 or 104, the pair of differential pins 110 of the connector 108 of the data link 106 are physically and electrically coupled to a pair of differential pins 110 of the connector 108 of the first or second electronic device 102 or 104. The pair of differential pins 110 of the connector 108 of the first or second electronic device 102 or 104 is configured to receive data from, or transmit data to, the differential pins 110 of the connector 108 of the data link 106.

Figure 2:
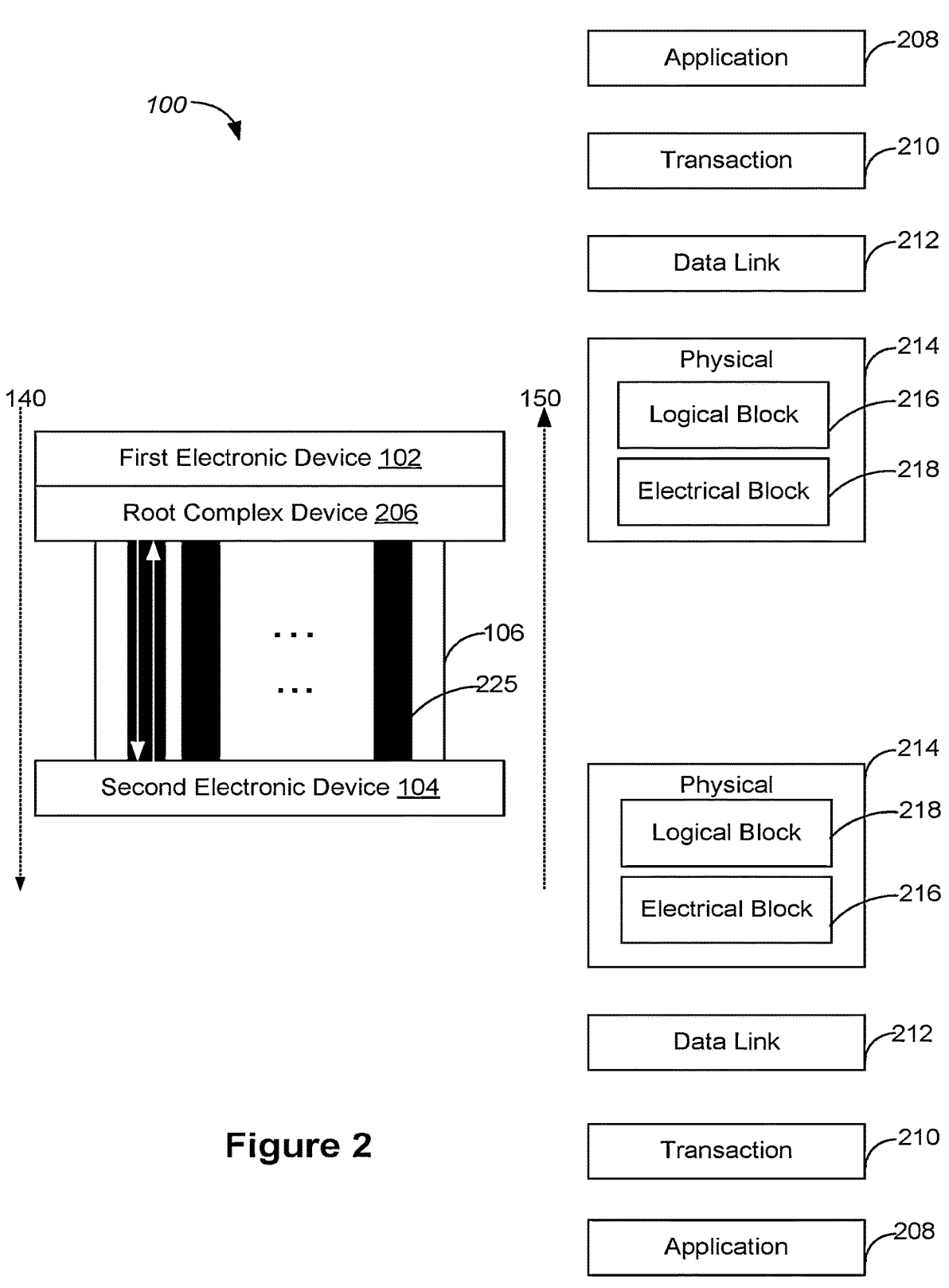
FIG. 2 is an example PCI Express electronic system in which a first electronic device or component is electrically coupled to a second electronic device or component via a data link, in accordance with some implementations.

FIG. 2 is an example PCI Express electronic system 100 in which a first electronic device or component 102 is electrically coupled to a second electronic device or component 104 via a data link 106, in accordance with some implementations. In an example, the first electronic device 102 includes a central processing unit (CPU) of a personal computer, and the second electronic device 104 is a peripheral component of the personal computer, such as a graphics card, a hard drive, a solid state drive, a Wi-Fi communication module, or an Ethernet card. The data link 106 includes a connection port for receiving from the second electronic device 104. The connection port is optionally formed on a mother board of the personal computer. The data link 106 complies with PCI Express (i.e., PCIe), which is a high-speed serial computer expansion bus standard, and provides an interface to communicate data packets between the first and second electronic devices 102 and 104 in compliance with the PCI Express. The data link 106 is a serial data bus including one or more data transmission channels 225. Each channel 225 includes two wire sets for transmitting and receiving data packets, thereby supporting full-duplex communication between the first and second electronic devices 102 and 104. In some examples, the data link 106 has 1, 4, 8, or 16 channels 225 coupled in a single data port of the data link 106. For each lane, the two wire sets correspond to a downstream data direction 140 or an upstream data direction 150 defined with respect to the first electronic device 102. Optionally, each wire set includes two wires for carrying a pair of differential signals.

In some implementations, the first electronic device 102 includes or is coupled to a root complex device 206 that is further coupled to the data link 106. The root complex device 206 is configured to generate requests for transactions including a series of one or more packet transmissions on behalf of the first electronic device 102. Examples of the transactions include, but are not limited to, Memory Read, Memory Read Lock, IO Read, IO Write, Configuration Read, Configuration Write, and Message. In some implementations, the first electronic device 102 is coupled to one or more additional electronic devices besides the second electronic device 104. The data link 106 includes one or more switch devices to couple the root complex device 206 of the first electronic device 102 to multiple endpoints including the second electronic device 104 and additional electronic devices not shown in FIG. 1.

PCI Express is established based on a layered model including an application layer 208, a transaction layer 210, a data link layer 212, and a physical layer 214. As the top layer, the application layer 208 is implemented in software programs, such as Ethernet, NVMe, SOP, AHCI, and SATA. In the transaction layer 210, each transaction of a series of packet transmissions is implemented as requests and responses separated by time. For example, a memory-related transaction is translated to device configuration and control data transferred to or from the second electronic device 104 (e.g., a memory device). Data packets associated with each transaction are managed by data flows on the data link layer 212. The physical layer 214 of PCI Express controls link training and electrical (analog) signaling, and includes a logical block 116 and an electrical block 118. The logic block 116 defines ordered data sets in training states (e.g., TS1 and TS2), and the electrical block 118 defines eye diagram characteristics and analog waveforms. Each layer of the layered model includes first specifications for a transmitting end where a root complex device 206 is coupled and second specifications for a receiving end where a peripheral component (i.e., the second electronic device 104) is coupled.

As high frequency signals are transmitted within the channels 225 of the data link 106, these signals are distorted and spread over sequential symbols and result in inter symbol interferences (ISI) and bit errors at the receiving end of the second electronic device 104. These ISI and bit errors can be suppressed by a feed-forward equalizer (FFE) 340 (FIG. 3A) that is coupled serially on a path of the data link 106 and configured with equalization settings using an equalization procedure. In an example, the FFE 340 includes a finite impulse response (FIR) filter. The equalization procedure is implemented when a high speed data transfer rate needs to be initialized, when an equalization request is issued from the application layer 208, or when a BER exceeds a data error tolerance. In some implementations, initiation and termination of the equalization procedure are detected on the physical layer 214 based on data packets transferred over the data link 106.

Figure 3A:
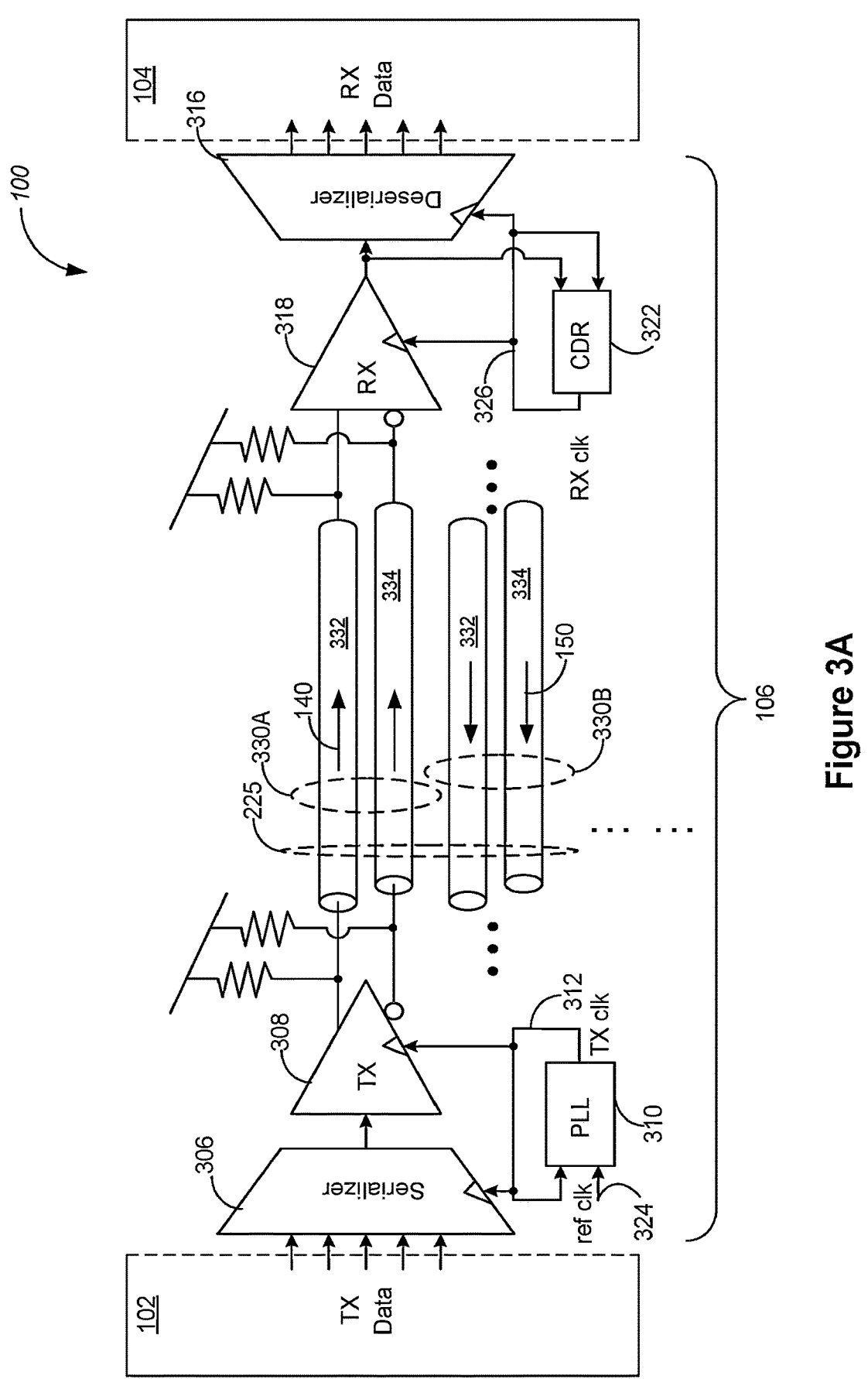
FIG. 3A is a block diagram an example electronic system in which a first electronic device or component is electrically coupled to a second electronic device or component via a data link, in accordance with some implementations.
Figure 3B:
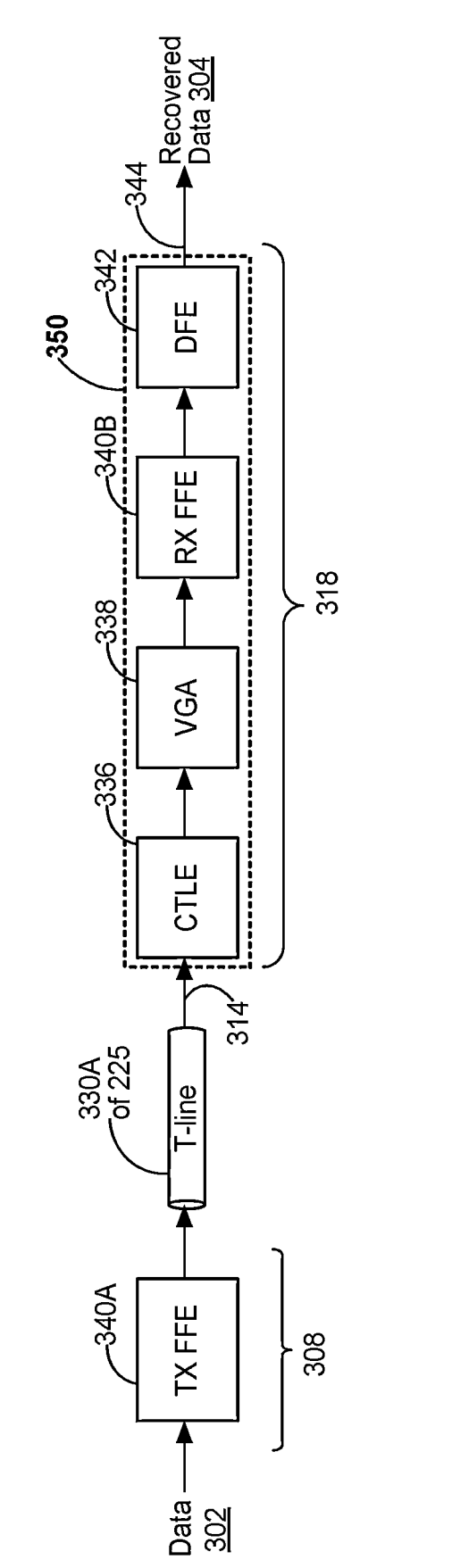
FIG. 3B is a block diagram of an example data link 106 including a plurality of modulation circuits 350, in accordance with some implementations.

FIG. 3A is a block diagram of an example electronic system 100 in which a first electronic device or component 102 is electrically coupled to a second electronic device or component 104 via a data link 106, in accordance with some implementations, and FIG. 3B is a block diagram of an example data link 106 including a plurality of modulation circuits 350, in accordance with some implementations. In an example, the first electronic device 102 includes a central processing unit (CPU) of a personal computer, and the second electronic device 104 is a peripheral component of the personal computer, such as a graphics card, a hard drive, a solid state drive, a Wi-Fi communication module, or an Ethernet card. The data link 106 includes a connection port for receiving data from the second electronic device 104. The connection port is optionally formed on a mother board of the personal computer. In some implementations, the data link 106 complies with a high-speed serial computer expansion bus standard (e.g., PCI Express (PCIe), USB 4) and provides an interface to communicate data packets between the first and second electronic devices 102 and 104 in compliance with the bus standard. The data link 106 is a serial data bus including one or more data channels 225. In some implementations, each data channel 225 includes two wire sets 330A and 330B (also called two data lanes) for transmitting and receiving data packets, respectively, thereby supporting full-duplex communication between the first and second electronic devices 102 and 104. In some examples, the data link 106 has 1, 4, 8, or 16 channels coupled in a single data port of the data link 106. For each data channel 225, the two wire sets 330A and 330B correspond to a downstream data direction 140 and an upstream data direction 150 defined with respect to the first electronic device 102, respectively. Optionally, each wire set 330A or 330B includes two respective wires 332 and 334 for carrying a pair of differential signals.

In some implementations, the first electronic device 102 includes or is coupled to a root complex device (not shown) that is further coupled to the data link 106. The root complex device is configured to generate requests for transactions including a series of one or more packet transmissions on behalf of the first electronic device 102. Examples of the transactions include, but are not limited to, Memory Read, Memory Read Lock, Input Output (IO) Read, IO Write, Configuration Read, Configuration Write, and Message. In some implementations, the first electronic device 102 is coupled to one or more additional electronic devices besides the second electronic device 104. The data link 106 includes one or more switch devices to couple the root complex device of the first electronic device 102 to multiple endpoints including the second electronic device 104 and additional electronic devices not shown in FIGS. 1 and 2.

A data transmission protocol (e.g., PCI Express, USB4 v2.0, DisplayPort 2.1) is established based on a layered model including an application layer 208, a transaction layer 210, a data link layer 212, and a physical layer 214. As the top layer, the application layer 208 is implemented in software programs, such as Ethernet, NVMe, SOP, AHCI, and SATA. In the transaction layer 210, each transaction of a series of packet transmissions is implemented as requests and responses separated by time. For example, a memory-related transaction is translated to device configuration and control data transferred to or from the second electronic device 104 (e.g., a memory device). Data packets associated with each transaction are managed by data flows on the data link layer 212. The physical layer 214 controls link training and electrical (analog) signaling, and includes a logical block and an electrical block. The logic block 216 defines ordered data sets in training states, and the electrical block 218 defines eye diagram characteristics and analog waveforms. Each layer of the layered model includes first specifications for a transmitting side where a root complex device is coupled and second specifications for a receiving side where a peripheral component (i.e., the second electronic device 104) is coupled.

As signals are transmitted within the wire sets 330 of each data channel 225 of the data link 106, the signals are distorted and spread over sequential symbols and result in inter symbol interferences (ISI) and bit errors at the receiving side of the second electronic device 104. In some implementations, these ISI and bit errors can be suppressed by an FFE 340 that is coupled serially on a path of the data link 106 and configured with equalization settings using an equalization procedure. For example, an equalization procedure is implemented when a high speed data transfer rate needs to be initialized, when an equalization request is issued from the application layer, or when a BER exceeds a data error tolerance.

The electronic system 100 includes a serializer and deserializer (SERDES) system corresponding to the data link 106. The SERDES system of the data link 106 includes a serializer 306, a transmitter 308, the data channel 225, a receiver 318, and a deserializer 316. The serializer 306 converts parallel data received from the first electronic device 102 to serial data. The transmitter 308 sends the serial data to the data channel 225. The receiver 318 processes the serial data and send the processed serial data to the deserializer 316, which converts the serial data back to the parallel data for the second electronic device 104. On a transmitting side, a phase lock loop 310 generates a transmitter clock signal 312 based on a reference clock signal 324, and the transmitter clock signal 312 is applied to control serialization of the data to be transmitted by the data channel 225 of the data link 106.

On a receiving side, a clock data recovery (CDR) circuit 322 is used to recover a receiver clock signal 326 from the serial data received via the data channel 225 and compensate for a variation of signal amplitudes caused by a loss and other factors in this data channel 225. In some implementations, the CDR circuit 322 further includes a sampler and a clock recovery circuit. In some implementations, the CDR circuit 322 is implemented based on one of: a phase-locked loop (PLL), a delay-locked loop (DLL), and a phase interpolator (PI). In some implementations, the CDR circuit 322 satisfies a BER requirement corresponding to a jitter tolerance. Additionally, the CDR circuit 322 complies with a communication interface standard (e.g., PCIe, USB4), is functional with spread spectrum clocking (SSC), and satisfies an electromagnetic interference (EMI) requirement. Under some circumstances, the CDR circuit 322 is configured to be applied in two or more data interfaces having different data rates and signal modulation schemes. The CDR circuit 322 is configurable, e.g., by offering a pull-in frequency range that is greater than a pull-in frequency range threshold and a jitter tolerance that is better than a jitter tolerance threshold. In some implementations, the CDR circuit 322 is optimized in both of the pull-in frequency range and jitter tolerance.

The receiver clock signal 326 generated by the CDR 322 is used with the receiver 318 and deserializer 316 to condition the serial data received via the data channel 106 and regenerate the parallel data from the serial data. During this process, the receiver 318 is configured to reduce signal distortion, data spreading over sequential symbols, inter symbol interference (ISI), and resulting bit errors of the serial data on the receiving side of the second electronic device 104. The receiver 318 is configured to generate an output data signal including the stream of data bits 302 in an input data signal of the receiver 318. In some implementations, the receiver 318 includes a signal conditioning front end applying one or more modulation circuits 350 to compensate for a loss from the data channel 225. Referring to FIG. 3B, in some implementations, the receiver 318 includes one or more of: a continuous time linear equalizer (CTLE) 336, a variable gain amplifier (VGA) 338, a feed-forward equalizer (FFE) 340B, and a decision feedback equalizer (DFE) 342. The CTLE 336 is configured to selectively attenuate low frequency signal components, amplify signal components around the Nyquist frequency, and remove higher frequency signal components to generate filtered serial data. Stated another way, in some implementations, the CTLE 336 includes an analog filter designed to equalize the signal loss in certain frequencies. The VGA 338 has a variable gain. The DFE 342 is configured to further amplify the filtered serial data, and recover one or more data bits at each clock switching edge or during each clock cycle. The one or more recovered data bits form data packets. In some implementations, the FFE 340B includes an FIR filter having a plurality of equalization settings (e.g., FIR coefficients), and is applied to improve signal quality of the data packets via digital signal conditioning (e.g., via high frequency filtering in a digital domain). In some implementations, feed forward equalization is optionally implemented by a transmitter-side FFE 340A, a receiver-side FFE 340B, both. The FFE 340A is configured to pre-distort the signal to compensate for the lossy data channel 225. In some implementations, a subset or all of the modulation circuits 350 is applied, and an order of the modulation circuits 350 is optionally identical to or distinct from that shown in FIG. 3B. As such, the receiver IC 304 receives an input data signal 314 carrying a stream of data bits 302 according to a reference clock frequency (e.g., a reference clock signal 324 in FIG. 3A), and outputs an output data signal 304 including a stream of recovered data bits 304 that is consistent with the stream of data bits 302, thereby reliably keeping the stream of data bits 302 in the input data signal 314.

In some implementations of this application, in-situ adaptation is implemented on different modulation circuits 350 of an electronic device (e.g., a second electronic device 104 in FIG. 1). The electronic device includes a sequence of modulation circuits 350, and each modulation circuit has one or more adjustable configurations. The electronic device obtains an input data signal 314. The sequence of modulation circuits 350 processes the input data signal 314 and generates an equalized data signal 344 including a first data sample. The electronic device determines a first residual error of the first data sample, and adjusts a first adjustable configuration of a first modulation circuit (e.g., CTLE 336) based on the first residual error. A second adjustable configuration of a second modulation circuit (e.g., VGA 338) is further adjusted based on the first adjustable configuration. In some implementations, a single receiver integrated circuit (IC) includes the sequence of modulation circuits 350 and is configured to operate with different data rates, ambient temperatures, protocols, cables, and operating environments. Each modulation circuit 350 of the receiver IC is highly programmable and adaptive to offer different equalizer strengths and configurations in support of highly variable operating conditions. Particularly, in-situ and real-time adaptations of the modulation circuits 350 are implemented dynamically, jointly, and iteratively without interfering with each other. As the operating conditions (e.g., ambient temperature) change in real time during operation, in-situ and real-time adaptation of the receiver IC makes the data communication link 106 transmit data reliably and adjustably in response to variations of the operating conditions.

Figure 4:
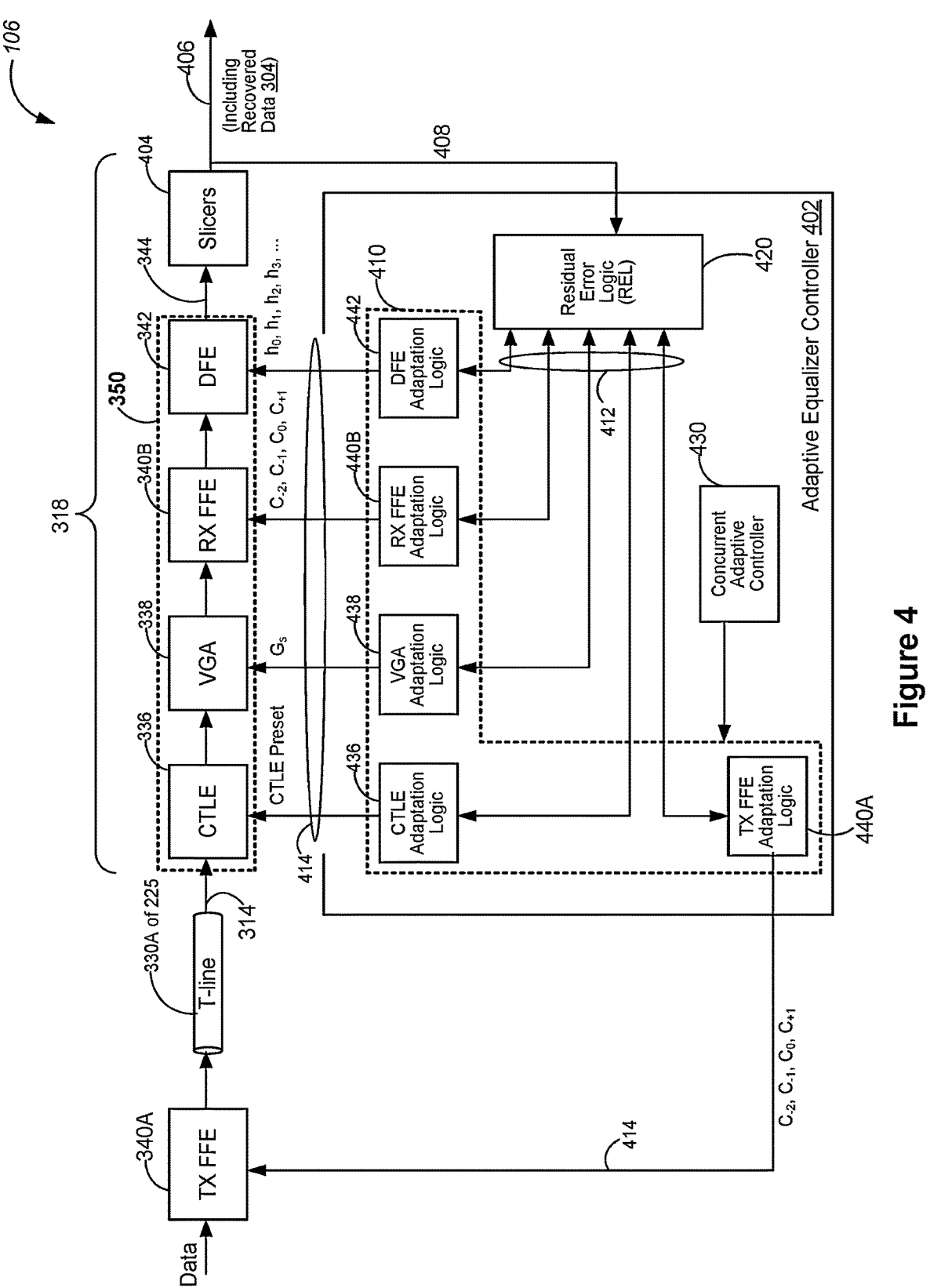
FIG. 4 is a block diagram of an in-situ equalization system 400 of a data link 106, in accordance with some implementations.

FIG. 4 is a block diagram of an in-situ equalization system 400 of a data link 106, in accordance with some implementations. The in-situ equalization system 400 includes an adaptive equalizer controller 402 and one or more modulation circuits 350. The one or more modulation circuits 350 include one or more of: a transmitter-side FFE 340A, a CTLE 336, a VGA 338, a receiver-side FFE 340B, and a DFE 342. The one or more modulation circuits 350 form a sequence of modulation circuits 350. The modulation circuits 350 of a receiver 318 receive an input data signal 314 transmitted by a wire set 330A and carrying a stream of data bits 302 and generate an equalized data signal 344, reducing the ISI caused by channel losses in a stream of recovered data bits 304 of the equalized data signal 344. The adaptive equalizer controller 402 is coupled to each of the one or more modulation circuits 350 and configured to control adaptation of the one or more modulation circuits 350 (e.g., concurrent adaptation of two or more modulation circuits 350). In some implementations, the transmitter 308 includes the FFE 340A, which is on a transmitter side distinct from a receiver side where the CTLE 336, VGA, FFE 340B, and DFE 342 are located. The adaptive equalizer controller 402 is coupled to the FFE 340 of the transmitter 308 via a separate side-channel or full-duplex backchannel.

In some implementations, a slicer 404 is coupled to the one or more modulation circuits 350. The slicer 404 receives the equalized data signal 344 and compares the equalized data signal 344 with one or more reference voltages to generate an output data signal 406 including the stream of recovered data bits 304. The output data signal 406 is provided to the adaptive equalizer controller 402 as an error feedback 408. In some implementations, the ISI caused by the wire set 330 is pre-compensated by the FFE 340A on a transmitter side. In some implementations, the ISI caused by the wire set 330 is reduced and partially compensated by the modulation circuits 350 on a receiver side. The output data signal 406 (also called error feedback 408) is sampled according to a receiver clock signal 326, and each sample of the output data signal 406 corresponds to a respective ISI cursor. After transmitter-side pre-compensation and/or receiver-side compensation, the error feedback 408 includes a residual error at each sample (i.e., at each ISI cursor), and each sample deviates from a voltage level of a corresponding data bit by the residual error. In some implementations, the error feedback 408 includes a sign of the residual error for each ISI cursor.

The adaptive equalizer controller 402 includes one or more adaptation logics 410 and a residual error logic (REL) 420. The one or more adaptation logics 410 includes one or more of: a FFE adaptation logic 440A, a CTLE adaptation logic 436, a VGA adaptation logic 438, a FFE adaptation logic 440B, and a DFE adaptation logic 442. In some implementations, each of a subset of the adaptation logics 410 is coupled to the REL 420 and a respective one of the modulation circuits 350. For example, the FFE adaptation logic 440A is coupled to the FFE 340A; the CTLE adaptation logic 436 is coupled to the CTLE 336; the VGA adaptation logic 438 is coupled to the VGA 338; the FFE adaptation logic 440B is coupled to the FFE 340B; and the DFE adaptation logic 442 is coupled to the DFE 342. For each of a subset of modulation circuit 350, the REL 420 determines a respective residual error 412 and provides the respective residual error 412 to the respective adaptation logic 410, which further adjusts an adjustable configuration of the respective modulation circuit 350 based on the residual error 412.

In some implementations, an adaptation logic 410 is configured to receive a respective residual error 412, adjust a respective adjustable configuration based on the respective residual error 412, and generates an equalizer control signal 414 to tune the respective adjustable configuration of a respective modulation circuit 350. In some implementations, the CTLE 336 includes a continuous time filter including an resistor capacitor (RC) network. The adjustable configuration of the CTLE 336 includes a plurality of resistance values (e.g., $R_0$, $R_1$, $R_2$) and a plurality of capacitance values (e.g., $CP_0$, $CP_1$) of the RC network. In some implementations, the adjustable configuration of the VGA 338 includes a gain $G_S$ that is adjusted continuously or selected from a number of predefined gains. In some implementations, the adjustable configuration of the FFE 440A or 440B corresponds to a plurality of FIR coefficients $C_{-r}$, . . . . $C_0$, . . . , and $C_{+s}$ (e.g., where r is equal to 2, and s is equal to 1). In some implementations, the adjustable configuration of the DFE 442 corresponds to a plurality of DFE coefficients $h_0$, . . . , and $h_d$. Additionally, in some implementations, for each modulation circuit 350, the adjustable configuration identifies a preset of adjustable coefficients in a corresponding preset table including a respective number of discrete adjustable settings. For example, the adjustable configuration of the CTLE 336 is selected from a preset table including a predefined number of discrete configuration settings of capacitors and resistors of the RC network. Higher a preset on the preset table, the stronger compensation provided by the CTLE 336.

Figure 5:
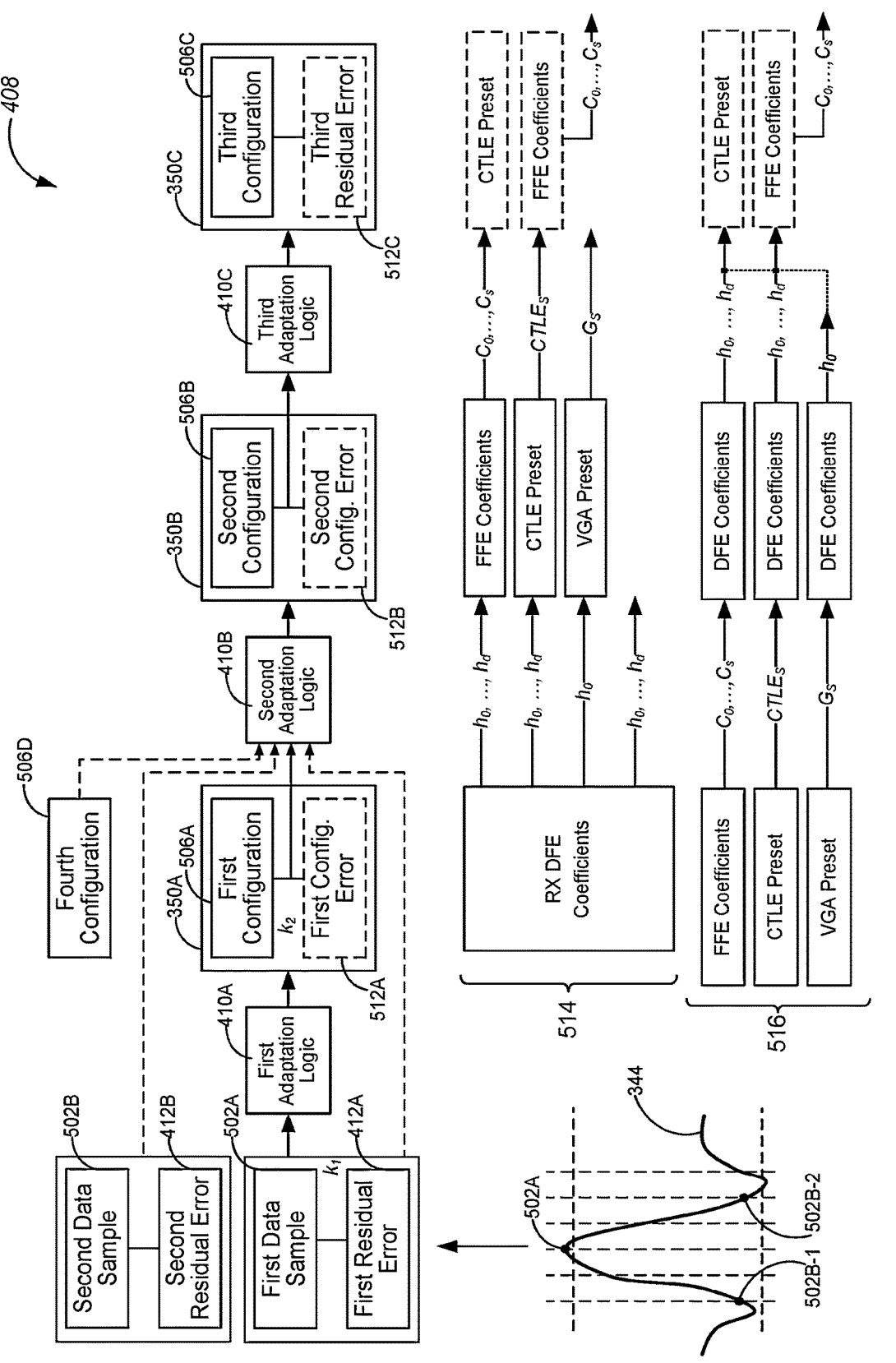
FIG. 5 is a flow diagram of a process of determining adjustable configurations of modulation circuits of a data link, in accordance with some implementations.

In some implementations, the adaptive equalizer controller 402 includes a concurrent adaptive controller 430 coupled to the adaptation logics 410. The concurrent adaptive controller 430 is configured to control coupling among the adaptation logics 410, such that a first adjustable configuration of a first modulation circuit 350A is determined by a first adaptation logic 410A (FIG. 5) based on a residual error 412 and provided to both the first modulation circuit 350A and a second adaptation logic 410B (FIG. 5). The first modulation circuit 350A processes the input data signal 314 based on the first adjustable configuration 506A (FIG. 5), and the second adaptation logic 410B determines a second adjustable configuration 506B for the second modulation circuit 350B based on the first adjustable configuration 506A. For example, the concurrent adaptive controller 430 provides control signals to couple the DFE adaptation logic 442 to the VGA adaptation logic 438. A DFE coefficient $h_0$ is determined by the DFE adaptation logic 442 based on a corresponding residual error 412 of a current sample and provided to both the DFE 342 and the VGA adaptation logic 438. The DFE 342 is updated to adopt the DFE coefficient $h_0$ and process the input data signal 314. The VGA adaptation logic 438 determines the gain value $G_S$ for the VGA 338 based on the DFE coefficient $h_0$.

FIG. 5 is a flow diagram of a process of determining adjustable configurations 506 of modulation circuits 350 of a data link 106, in accordance with some implementations. A residual error logic 420 is coupled to a slicer 404 and one or more adaptation logics 410 including one or more of: a FFE adaptation logic 440A, a CTLE adaptation logic 436, a VGA adaptation logic 438, a FFE adaptation logic 440B, and a DFE adaptation logic 442 (FIG. 4). The FFE adaptation logic 440A, CTLE adaptation logic 436, VGA adaptation logic 438, FFE adaptation logic 440B, and DFE adaptation logic 442 further couple the REL to the FFE 340A, CTLE 336, VGA 338, FFE 340B, and DFE 342, respectively. The residual error logic 420 is configured to receive an output data signal 406 including the stream of recovered data bits 304, obtain a plurality of data samples 502, and determine one or more residual errors 412. For example, the REL 420 obtains the output data signal 406 including a first data sample 502A and/or a second data sample 502B, and generates the residual errors 412 including a first residual error 412A of the first data sample 502A and/or a second residual error 412B of the second data sample 502B. The second data sample 502B precedes or follows the first data sample 502A. Each of the modulation circuits 350 updates its own respective adjustable configuration 506 based on associated residual error(s) 412, an adjustable configuration of a different modulation circuit 350, or a combination thereof.

In some implementations, a first adaptation logic 410A is configured to obtain one or more residual errors 412 from the residual error logic 420, update a first adjustable configuration 506A of a first modulation circuit 350A based on the obtained residual errors 412, and optionally determine a first configuration error 512A of the first adjustable configuration 506A. Alternatively, in some implementations, a second adaptation logic 410B is configured to obtain configuration information of one or more distinct modulation circuit (e.g., the adjustable configuration 506A or a configuration error 512A of the first modulation circuit 350A), and update an associated adjustable configuration 506B of a second modulation circuit based on the obtained configuration information of the distinct modulation circuit. Additionally and alternatively, in some implementations, the second adaptation logics 410B is configured to obtain both a residual error 412A or 412B and configuration information of distinct modulation circuit (e.g., the adjustable configuration 506A or configuration error 512A of the first modulation circuit 350A), and update an associated adjustable configuration 506B of a respective modulation circuit 350 based on both the residual error 412 and the configuration information.

More specifically, in some implementations, the REL 420 includes a first adaptation logic 410A and a second adaptation logic 410B. An output data signal 406 includes a first data sample 502A. The residual error logic 420 determines a first residual error 412A of the first data sample 502A. The first adaptation logic 410A obtains the first residual error 412A, and adjusts a first adjustable configuration 506A of a first modulation circuit 350A based on the first residual error 412A. The second adaptation logic 410B adjusts a second adjustable configuration 506B of a second modulation circuit 350B based on the first adjustable configuration 506A. By these means, the second adjustable configuration 506B is not adjusted based directly on data samples 502 or associated residual errors 412 of the output data signal 406, and is adjusted by providing an accumulative adjustment effect dynamically, jointly, or iteratively with the first adjustable configuration 506A, thereby expediting an adaptation process of the modulation circuit 350.

In some implementations, the modulation circuit 350A or 350B determines a first configuration error 512A corresponding to the first adjustable configuration 506A, and the second adjustable configuration 506B is adjusted based on the first configuration error 512A. In some implementations, adjustments of the first and second adjustable configurations 506A and 506B are weighted differently, as the configurations 506A and 506B are adjusted jointly. The first adaptation logic 410A applies a first scale factor $k_1$ to the first residual error 412A, and the second adaptation logic 410B applies a second scale factor $k_2$ to the first configuration error 512A, while the first adjustable configuration 506A of the first modulation circuit 350A and the second adjustable configuration 506B of the second modulation circuit 350B are adjusted jointly and iteratively.

In some implementations, a third adaptation logic 410C is configured to adjust a third adjustable configuration 506C of a third modulation circuit 350C based on the second adjustable configuration 506B. Further, in some implementations, the adaptation logic 410B or 410C determines a second configuration error 512B corresponding to the second adjustable configuration 506B, and the third adjustable configuration 506C is adjusted based on the second configuration error 512B. In some implementations, adjustments of the first, second, and third adjustable configurations 506A, 506B, and 506C are weighted differently, as the configurations 506A, 506B, and 506C are adjusted jointly. For example, scale factors $k_1$, $k_2$, and $k_3$ are applied to the first residual error 412A, the first configuration error 512A, the second configuration 512B, respectively. By these means, the first, second, and third configurations 506A, 506B, and 506C of different modulation circuits 350 are adjusted dynamically, jointly, and iteratively to provide an accumulative effect on suppressing ISI, enhancing SNR, and reducing BER of the output data signal 406, thereby expediting an adaptation process of the modulation circuit 350.

In some implementations, the second adaptation logic 410B obtains a second residual error 412B of a second data sample 502B of the output data signal 406. The second data sample 502B is distinct from the first data sample 502A. The second adaptation logic 410B adjusts the second adjustable configuration 506B based on the first adjustable configuration 506A and one or more of: the first data sample 502A, the first residual error 412A, the second data sample 502B, and the second residual error 412B of the output data signal 406. Optionally, the second data sample 502B-1 precedes the first data sample 502A of a current ISI cursor and corresponds to a prior ISI cursor temporally preceding the current ISI cursor. Optionally, the second data sample 502B-2 follows the first data sample 502A of a current ISI cursor and corresponds to a post ISI cursor temporally following the current ISI cursor.

In some implementations, the second adaptation logic 410B adjusts the second adjustable configuration 506B based on the first adjustable configuration 506A and one or more of: the first data sample 502A and the first residual error 412A of the output data signal 406. In some implementations, a fourth adjustable configuration 506D of a fourth modulation circuit 350D is adjusted based on the output data signal 406 (e.g., a data sample 502, a residual error 412). The second adaptation logic 410B adjusts the second adjustable configuration 506B based on both the first adjustable configuration 506A and the fourth adjustable configuration 506D, e.g., in a weighted manner. Additionally, in an example, a fourth adjustable configuration 506D has a fourth configuration error, and the second adjustable configuration 506B is determined based on the first and fourth configuration errors, e.g., in the weighted manner. In some implementations, the second adaptation logic 410B adjusts the second adjustable configuration 506B based on the first adjustable configuration 506A and one or more of: the second data sample 502B and the first residual error 412A of the output data signal 406. In some implementations, the second adaptation logic 410B adjusts the second adjustable configuration 506B based on the first adjustable configuration 506A, the first data sample 502A, the second data sample 502B, and the fourth adjustable configuration 506D.

In some implementations, the sequence of modulation circuits 350 includes a CTLE 336, a VGA 338, a FFE 340 (e.g., 340A, 340B), and a DFE 342 (FIG. 4). The CTLE 336 has an adjustable CTLE preset $CTLE_S$ identifying one of a plurality of predefined sets of resistances of resistors and capacitances of resistors of the CTLE 336. The VGA 338 has an adjustable gain $G_S$. The FFE 340 has an adjustable FFE preset of FFE coefficients $C_{-r}, \ldots C_0, \ldots$ and $C_S$. The DFE 342 has an adjustable DFE preset of DFE coefficients $h_0$, $h_1, \ldots$ and $h_d$. Referring to FIG. 5, in some implementations (514), the first modulation circuit 350A includes the DFE 342, and the first adjustable configuration 506A includes a subset of the adjustable DFE preset of DFE coefficients $h_0$, $h_1, \ldots$ and $h_d$. The second modulation circuit 350B includes one of the FFE 340, CTLE 336, and the VGA 338. The second adjustable configuration 506B includes a corresponding subset of the FFE preset of FFE coefficients $C_{-r}, \ldots C_0, \ldots$ and $C_s$, the CTLE preset $CTLE_S$, and the adjustable gain $G_S$. In some implementations, the subset of the FFE preset of FFE coefficients $C_{-r}, \ldots C_0, \ldots$ and $C_s$ is further applied to determine the CTLE preset $CTLE_S$, or vice versa.

Conversely, in some implementations (516), the second modulation circuit 350B includes the DFE 342, and the second adjustable configuration 506B includes a subset of the adjustable DFE preset of DFE coefficients $h_0$, $h_1, \ldots$ and $h_d$. The first modulation circuit 350A includes one of the FFE 340, CTLE 336, and the VGA 338, and the first adjustable configuration 506A includes a corresponding subset of the FFE preset of FFE coefficients $C_{-r}, \ldots C_0, \ldots$, and $C_s$, the CTLE preset $CTLE_S$, and the adjustable gain $G_S$. In some implementations, the adjustable DFE preset of DFE coefficients $h_0$, $h_1, \ldots$ and $h_d$, which is adjusted based on the FFE preset, is further applied to determine the CTLE preset $CTLE_S$. In some implementations, the adjustable DFE preset of DFE coefficients $h_0$, $h_1, \ldots$ and $h_d$, which is adjusted based on the CTLE preset $CTLE_S$, is further applied to determine the FFE preset. In some implementations, the DFE coefficients $h_0$, which is adjusted based on the adjustable gain $G_S$, is further applied to determine the CTLE preset $CTLE_S$ or the FFE coefficient $C_0$.

In some implementations, the second modulation circuit 350B includes the DFE 342, and the second adjustable configuration 506B includes a subset of the adjustable DFE preset of DFE coefficients $h_0$, $h_1, \ldots$ and $h_d$. The first modulation circuit 350A includes two or more of the FFE 340, CTLE 336, and the VGA 338, and the first adjustable configuration 506A includes a combination of two or more selected configurations of the FFE preset of FFE coefficients $C_{-r}, \ldots C_0, \ldots$ and $C_s$, the CTLE preset $CTLE_S$, and the adjustable gain $G_S$. For example, an average or a weighted combination of the two or more selected configurations is applied to determine the second adjustable configuration 506B.

In some implementations, the first modulation circuit 350A includes the DFE 342, and the first adjustable configuration includes a DFE coefficients $h_0$. The second modulation circuit 350B includes the VGA 338, and the second adjustable configuration 506B includes the adjustable gain $G_S$. The DFE coefficients $h_0$ and adjustable gain $G_S$ are adjusted jointly to suppress a first residual error 412A of a first data sample 502A associated with a current ISI cursor.

In some implementations, the first modulation circuit 350A includes the DFE 342, and the first adjustable configuration 506A includes a subset of the adjustable DFE preset of DFE coefficients $h_0$, $h_1, \ldots$ and $h_d$. The second modulation circuit 350B includes the FFE 340, and the second adjustable configuration 506B includes a first subset of the FFE preset of FFE coefficients $C_0, \ldots$ and $C_s$. Further, in some implementations, the second adaptation logic 410B obtains a sequence of successive residual errors 412B that immediately precedes the first residual error 412A. The sequence of successive residual errors 412B corresponds to a sequence of successive data samples 502B-1 that immediately precedes the first data sample 502A. A second subset of the FFE preset of FFE coefficients $C_{-r}, \ldots$, and $C_{-1}$ is adjusted based on the sequence of successive residual errors 412B and the first data sample 502A.

In some implementations, the first modulation circuit 350A includes the DFE 342, and the first adjustable configuration 506A includes a subset of the adjustable DFE preset of DFE coefficients $h_1, \ldots$ and $h_d$. The second modulation circuit 350B includes one of the CTLE 336, and the second adjustable configuration 506B includes the CTLE preset $CTLE_S$.

In some implementations, the sequence of modulation circuits 350 includes a DFE 342 having an adjustable DFE preset of DFE coefficients $h_0$, $h_1, \ldots$ and $h_d$. The output data signal 406 includes a sequence of successive data samples 502 that starts with the first data sample 502A followed by one or more data samples 502B-2, and every two successive data samples 502 are delayed from each other by a unity delay. The first adaptation logic 410A adjusts an i-th DFE coefficients $h_i$ based on an (i+1)-th data sample of the sequence of successive data samples 502 and the first residual error 412A, where i is an integer equal to or greater than 0. In an example, the first adaptation logic 410A adjusts the DFE coefficient $h_0$ based on the first data sample 502A and the first residual error 412A. In another example, the first adaptation logic 410A adjusts the DFE coefficient $h_2$ based on the residual sample 502B-2 (FIG. 5) and the first residual error 412A.

Figures 6A, 6B:
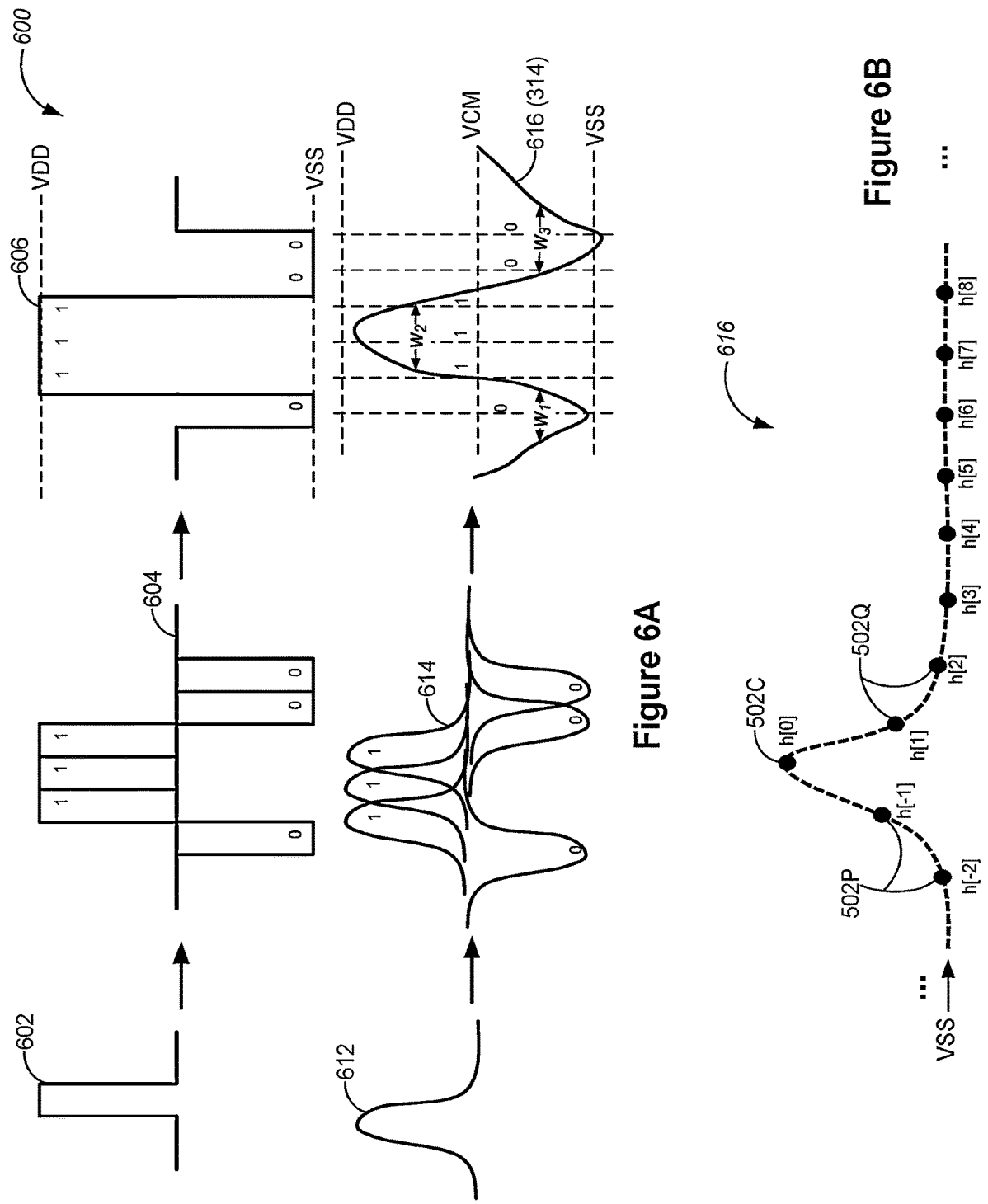
FIG. 6A illustrates an effect of inter-symbol interference (ISI) on data transmission in a pulse amplitude modulation (PAM) scheme, in accordance with some implementations.
FIG. 6B is a temporal diagram of a data signal including a plurality of samples, in accordance with some implementations.

FIG. 6A illustrates an effect of inter-symbol interference (ISI) 600 on data transmission in a pulse amplitude modulation (PAM) scheme, in accordance with some implementations. In some implementations, a data bit 302 is transmitted by an ideal data channel 225 having no loss. The data bit 302 corresponds to a single-bit response (SBR) 602 including a single pulse. A data bit of "1" or "0" corresponds to a rectangular pulse having an amplitude above or below a common mode level, respectively. A series of data bits has a data pattern 011100 and corresponds to a series of SBRs 604 that are superimposed to one another to form an ideal data signal 606. The ideal data signal 606 includes a train of pulses alternating between two volage levels VDD and VSS. The two voltage voltages VDD and VSS are above and below the common mode level VCM and represent the data bits of "1" and "0", respectively. Each pulse of the ideal data signal 606 has a respective pulse width that is determined by a number of identical data bits in the respective pulse. Each pulse of the ideal data signal 302 has a rising edge and a falling edge, and both the rising and falling edges are substantially sharp (e.g., have edge rates that are greater than a threshold rate).

In some implementations, the data channel 225 has a loss caused by ISI, and a data bit 302 corresponds to a single-bit response (SBR) 612 including a single pulse (e.g., a cosine squared pulse, a Gaussian pulse), which is not a rectangular pulse. A data bit of "1" or "0" corresponds to a non-rectangular pulse (e.g., a cosine squared pulse) having an amplitude above or below the common mode level, respectively. A series of data bits having the data pattern 011100 corresponds to a series of SBRs 614 that are superimposed to one another to form a data signal 616 in FIG. 6 (e.g., corresponding to an input data signal 314 or an equalized data signal 344 in FIG. 3B). The data signal 616 includes a train of pulses alternating between two peak volage levels. The two peak voltage voltages are above and below a common mode level VCM, and correspond to the data bits of "1" and "0", respectively. Each pulse of the ideal data signal 606 has a respective pulse width (e.g., $w_1$, $w_2$, and $w_3$) that is determined by a number of identical data bits in the respective pulse. Each pulse of the ideal data signal 302 has a rising edge and a falling edge. Both the rising and falling edges are degraded by ISI 600, and therefore, are not substantially sharp (e.g., have edge rates that are less than the threshold rate). In some implementations, if the data signal 616 is sampled before equalization, the stream of data bits recovered from the data signal 616 may include a number of bit errors that is beyond a bit error tolerance of the data communication channel 225.

FIG. 6B is a temporal diagram of a data signal 616 (e.g., an output data signal 406 in FIG. 4) including a plurality of samples 502, in accordance with some implementations. The data signal 616 includes a stream of data bits that are coded onto the data signal 616 according to a reference frequency of a reference clock signal 324 on a transmitter side. When the data signal 616 is sampled at the reference frequency, the effect of ISI 600 is quantified based on measurement of samples 502 of the data signal 314. In some implementations, the output data signal 406 is sampled at the reference frequency of the reference clock signal 324, i.e., at every unit interval. Each sample 502 is denoted as h[x], where x is a variable tap index. In some implementations, a current sample 502C (i.e., h[0]) corresponds to an index value equal to 0. Negatively indexed values correspond to precursor samples 512P (e.g., h[−1], h[−2]), which reflects an effect of precursor ISI. The precursor ISI degrades signal quality of the data bits 302 transmitted over the data channel 225 before the current sample 502C. Positively indexed values correspond to postcursor samples 512Q (e.g., h[1], h[2] . . . h[8]), which reflects an effect of postcursor ISI. The postcursor ISI degrades signal quality of the data bits 302 transmitted over the data communication channel 225 after the current sample 502C. The current sample 502A (h[0]) is not impacted by ISI, contains actual information of a current data bit 302, and is referred to as a main cursor. In some implementations, an adaptive equalizer controller 402 reduces the effect of ISI 600 by reducing or suppressing precursor and postcursor ISI and/or by amplifying a magnitude of the current sample (i.e., the main cursor), thereby enhancing BER of an associated data link 106.

Figures 7A, 7B:
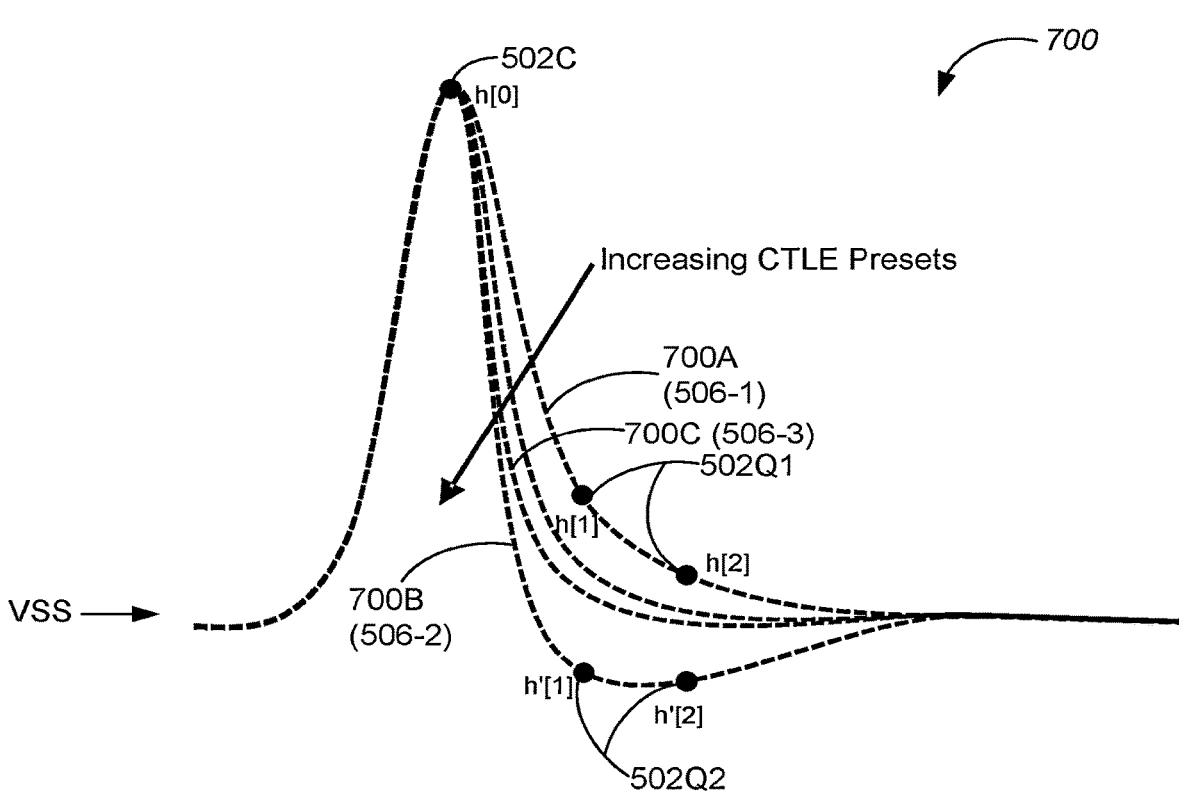
FIG. 7A is a temporal diagram of example data signals that are processed and outputted by a CTLE, in accordance with some implementations.
FIG. 7B is a temporal diagram of an data signal that is processed and outputted by a VGA, in accordance with some implementations.

FIG. 7A is a temporal diagram of example data signals 700 that are processed and outputted by a CTLE 336, in accordance with some implementations. The CTLE 336 is a continuous time filter configured to at least partially compensate for a channel loss caused by the data channel 225 to which the CTLE 335 is coupled. The CTLE 336 includes an RC network. Adjustable configuration 506 of the CTLE 336 includes a plurality of resistance values (e.g., $R_0$, $R_1$, $R_2$) and a plurality of capacitance values (e.g., $CP_0$, $CP_1$) of the RC network. In some implementations, the adjustable configuration 506 of the CTLE 336 identifies a preset of adjustable coefficients in a corresponding preset table including a respective number of discrete adjustable settings. For example, the adjustable configuration of the CTLE 336 is selected from a preset table including a predefined number of discrete configuration settings of the RC network. Higher a preset on the preset table, the stronger compensation provided by the CTLE 336, and the lower ISI observed on a corresponding data signal 700.

In this example, the data signals 700 include a first data signal 700A and a second data signal 700B. The main cursors (i.e., the current samples 512 (h[0])) are normalized on the data signals 700. The first data signal 700A corresponds to a first CTLE preset 506-1 and includes postcursor samples 502Q1 (e.g., h[1] and h[2]). The second data signal 700B corresponds to a second CTLE preset 506-2 and includes postcursor samples 502Q2 (e.g., h'[1] and h'[2]). The first CTLE preset 506-1 is lower than the second CTLE preset 506-2. Each postcursor sample 502Q2 is smaller than a respective postcursor sample 502Q1, and the CTLE 336 provides stronger ISI compensation in the second data signal 700B compared with the first data signal 700A.

A preferred CTLE preset is identified in accordance with a determination that ISI cursors are substantially near zero (i.e., that all precursor samples 502P and post-cursor samples 502Q are substantially equal to VSS or within a predefined threshold range of VSS). Referring to FIG. 7A, a third data signal 700C located between the data signals 700A and 700B appears to provide the preferred CTLE preset 506-3. In contrast, the first data signal 700A corresponds to an under-compensation condition in which the postcursor samples 502Q1 are above VSS, and the second data signal 700B corresponds to an over-compensation condition in which the postcursor samples 502Q1 are below VSS (e.g., goes beyond the predefined threshold range of VSS). The low voltage level VSS corresponds to a data bit of "0". In some implementations, the low voltage level VSS is a ground level.

In some implementations, an adaptive CTLE loop is formed to provide the equalizer control signal 414 that controls the CTLE 336. Referring to FIG. 4, samples 502 of the output data signal 406 are collected to determine associated residual errors 412. In accordance with a determination that the residual errors of the postcursor samples 502Q are positive, the CTLE preset is incremented. Conversely, in accordance with a determination that the residual errors 412 of the postcursor samples 502Q are negative, the CTLE preset is decremented. The CTLE preset is iteratively adjusted based on the residual errors of the postcursor samples 502Q until the preferred CTLE preset is identified (i.e., until the residual errors of the postcursor samples 502Q fall within the predefined threshold range of VSS). In some implementations, the residual errors of the postcursor samples 502Q vary monotonically with respect to the CTLE preset, i.e. higher preset in the preset table corresponds to lower postcursor sample values. In some implementations, the CTLE adaptation logic 436 includes a decoding table. The CTLE adaptation logic 436 obtains the preferred CTLE preset, and determines filter control signals for resistors and capacitors of the RC network of the CTLE 336 to select a subset of the resistors and capacitors. The filter control signals tune the pole/zero locations of the CTLE 336.

FIG. 7B is a temporal diagram of an data signal 740 that is processed and outputted by a VGA 338, in accordance with some implementations. The VGA 338 is a modulation circuit 350 used with other equalization circuit, and is not an equalizer by itself. In some implementations, the VGA 338 is used jointly with the CTLE 336 to enhance signal integrity. From a different perspective, the VGA 338 is a continuous time filter configured to provide a flat gain across a VGA frequency band. The VGA 338 enhances an overall amplitude of the data signal 740, such that an SNR of a data signal 406 generated by the slicer 404 (FIG. 4) is improved (i.e., a signal amplitude of the data signal 406 increases, while noise from the slicer 404 stays constant). Adjustable configuration of the VGA 338 includes a gain value $G_S$ that is adjusted continuously or selected from a number of predefined gains (also called VGA gain presets). As VGA gain preset increases, the amplitude of the data signal 740 increases. In some implementations, the VGA gain preset is high, such that the data signal 740 begins to clip and distortion occurs. A preferred VGA gain preset maximizes a peak of the data signal 740 without causing distortion.

In some implementations, a residual error 412 is identified for the main cursor h[0] (i.e., a current sample 502C) of the data signal 740 by comparing the current sample 502C with a pre-programmed target value of h[0]. A VGA preset update logic (not shown) applies the residual error 412 identified for the main cursor h[0] to update the adjustable configuration of the VGA 338 including the gain value G. In accordance with a determination that the residual error 412 is less than 0 (i.e., the current sample 502C is lower than the targe value of h[0]), the VGA gain preset is incremented. Conversely, in accordance with a determination that the residual error 412 is greater than 0 (i.e., the current sample 502C is greater than the targe value of h[0]), the VGA gain preset is decremented. A preferred gain value or a preferred VGA gain preset is determined in accordance with a determination that the residual error 412 of the main cursor h[0] is within a predefined threshold range of 0 or in accordance with a determination that the current sample 502A is substantially close to the pre-programmed target value of h[0] (i.e., within a predefined threshold range of the pre-programmed target value of h[0]).

Additionally, in some implementations, a DFE 342 is a commonly used equalization technique that uses a set of coefficients $C_{-r}, \ldots, C_0, \ldots$, and $C_{+s}$ to estimate the ISI at sampling period spaced intervals. These coefficients are multiplied with the sign of previously received bits and then subtracted from the incoming data, thus removing some of the ISI seen at the slicer 404 and improving the BER. In some implementations, a data signal is summed with a series of DFE weights that are multiplied with the sign of delayed data decisions. A DFE coefficient update logic is configured for updating the coefficients by comparing the sign of the residual error measured by the slicer 404 with the sign of the data decisions. A common way to implement the DFE adaptation logic 442 is to use a sign-sign least-mean-square (SSLMS) algorithm, which is an efficient form of stochastic gradient descent (SGD) algorithm. The adaptive logic operates by finding the sign of the residual error of each postcursor ISI tap (i.e., each postcursor sample 512Q in FIG. 6B). In some implementations, the residual error includes a combination of a data sample and an error sign, and is denoted as e[0]*d[n], where e[0] is the sign ("+" or "−") of a residual error 412 measured at a current sampling interval and corresponding to a current sample 502C, d[n] is a digital value ("1" or "0", which is represented as "+" or "−") of a data decision measured at the previous n-th interval, and n is a positive integer. If the resulting residual error e[0]*d[n] is positive, the estimated DFE coefficient $h_n$ should be incremented, and conversely, if e[0]*d[n] is negative, then estimated DFE coefficient $h_n$ should be decremented. This procedure is then repeated for the current sample 512C and postcursor samples 502Q (i.e. h[0], h[1], h[2], . . . ). Precursor samples 502P (i.e. h[−1], h[−2]) cannot be corrected by the DFE 342.

In some implementations, an FFE 340 includes a transversal FIR filter that is optionally implemented on a transmitter side, a receiver side, or both. The FFE 340 convolves a data signal and reduces the effect of ISI on the data signal. In some implementations, the FEE complexity of the transmitter-side FFE 340A is lower compared to a receiver-side FFE 340B. Adaptation of the FFEs 340A and 340B are similarly implemented, except that, in some implementations, the transmitter-side FFE 340A is coupled to a side channel that allows the equalizer control signal 414 to be returned to the receiver-side FFE 340B. Adjustable configuration of the FFE 340A or 340B corresponds to a plurality of FIR coefficients $C_{-r}, \ldots, C_0, \ldots$, and $C_{+s}$. In some implementations, the adjustable configuration of the FFE 340 identifies a preset of adjustable FIR coefficients in a corresponding preset table including a respective number of discrete adjustable settings.

In some implementations, the FFE 340 includes a series of unit delays and gain cells, and is configured to sum intermediate waveforms to produce a data signal. Weights or gains (e.g., FFE coefficients) of delayed signals are adjusted, such that the data signal reaching the slicer 404 exhibits minimal amount of ISI. A collection of weights (e.g., FFE coefficients) is controlled by a FFE coefficient update logic. The plurality of FIR coefficients $C_{-r} \ldots, C_0, \ldots$, and $C_{+s}$ are sent back from the FFE adaptation logic 440B to the FFE 340. It is noted that the FFE 340 equalizes current samples 512C (h[0]), precursor samples 512P (e.g. h[−1], h[−2]), and postcursor samples 512Q (e.g. h[1], h[2]). For example, error signals for FFE precursor adaptation include combinations of a current sample 502C with different residual errors e[n]*d[0], where n represents the n-th precursor coefficient. In an example, e[2]*d[0] is used to adapt the FIR coefficient $C_{-2}$ based on a current sample 502C ("1" or "0") and a residual error of a precursor sample 502P (e.g., represented by a sign of the residual error of the precursor sample 502P ("+" or "−"). In accordance with a determination that the current sample 502C is equal to "1" (also represented as "+") and the residual error of the precursor sample 502P (e[2]) is equal to "+", the FIR coefficient $C_{-2}$ is decreased. In accordance with a determination that the current sample 502C is equal to "0" (also represented as "−") and the residual error of the precursor sample 502P (e[2]) is equal to "+", the FIR coefficient $C_{-2}$ is increased.

Figure 8:
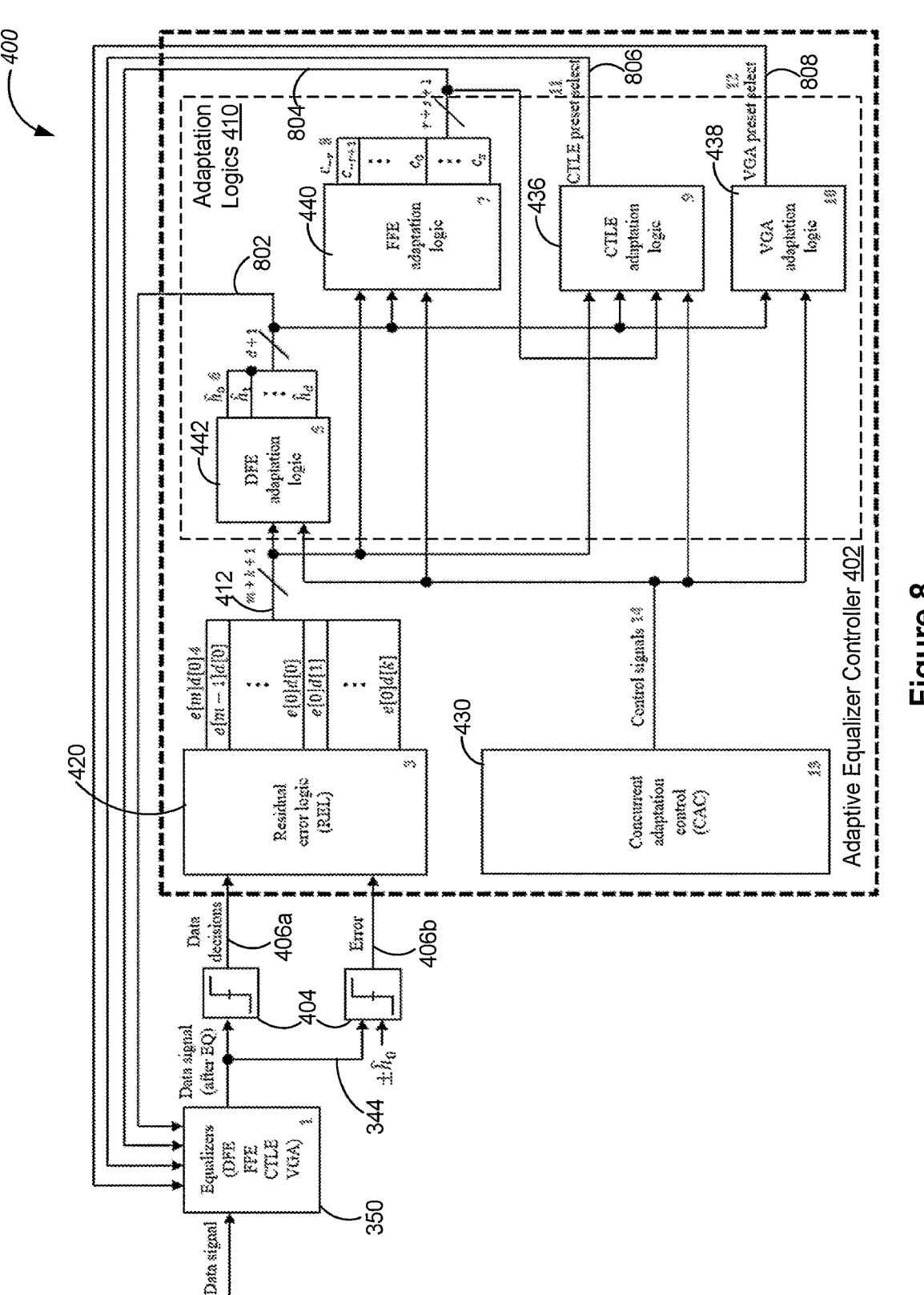
FIG. 8 is a block diagram of another example in-situ equalization system of a data link including an adaptive equalizer controller having a residual error logic, in accordance with some implementations.

FIG. 8 is a block diagram of another example in-situ equalization system 400 of a data link 106 including an adaptive equalizer controller 402 having a residual error logic 420, in accordance with some implementations. A data link 106 (FIG. 3A) includes a transmitter 308 and a receiver 318. The receiver 318 is configured to generate an equalized data signal 344 (FIG. 3B) including a stream of data bits 302 in an input data signal 314 of the receiver 318. In some implementations, the data link 106 includes one or more modulation circuits 350 to compensate for a loss from the data communication channel 225. The one or more modulation circuit 350 includes one or more of: the CTLE 336, VGA 338, FFE(s) 340, and DFE 342. A slicer 404 is coupled to the one or more modulation circuits 350. The slicer 404 receives the equalized data signal 344 and samples the equalized data signal 344 to generate an output data signal 406 including a plurality of samples. The output data signal 406 is provided to the adaptive equalizer controller 402, which adapts adjustable configuration of a subset or all of the one or more modulation circuit 350 having one or more adjustable configurations concurrently (e.g., simultaneously, in real time).

In some implementations, the output data signal 406 is sampled according to a sampling rate (e.g., related to a clock frequency of a receiver clock signal 326), and each sample of the output data signal 406 corresponds to a respective ISI cursor. After transmitter-side pre-compensation and/or receiver-side compensation, the output data signal 406 includes a residual error at each sample, and the respective sample deviates from a predefined voltage level of a corresponding data bit by the residual error. In some implementations, the data signal 406 includes a current sample 502C, one or more postcursor samples 502Q, and one or more precursor samples 502P, and each sample 502 corresponds to a residual error 412. Further, in some implementations, the slicer 404 compares each sample 502 with a common mode voltage to determine a corresponding data bit 406a as "1" or "0" (also as "+" or "−"). Each sample 502 is further compared with the predefined voltage level VDD or VSS of the corresponding data bit to determine a corresponding error sign 406b (e.g., "+", "−"). Each sample 502 corresponds to a respective residual error 412 that is determined based on a combination of the data bit 406a and the error sign 406b. Stated another way, in some implementations, each residual error 412 is determined by the residual error logic 420 based on respective sampling and residual references (e.g., the common mode voltage, the predefined voltage levels VDD and VSS).

The adaptive equalizer controller 402 includes a residual error logic 420 that is coupled to a slicer 404 and one or more adaptation logics 410. The adaptation logic(s) 410 include one or more of: a FFE adaptation logic 440A, a CTLE adaptation logic 436, a VGA adaptation logic 438, a FFE adaptation logic 440B, and a DFE adaptation logic 442

(FIG. 4). The residual error logic 420 is configured to receive a plurality of data samples 502 and a plurality of residual errors 412 of the output data signal 406 including the stream of recovered data bits 304. The plurality of data samples 502 includes samples d[0], d[1], . . . , and d[k], which equal to "1" or "0" (also represented as "+" or "−"), and the plurality of residual errors 412 includes samples e[m], e[m−1], . . . , and e[0], where k and m are two distinct positive integers. In some implementations, each of the plurality of residual errors 412 includes a sign of the respective residual error, and an adaptation logic 410 adjusts a corresponding adjustable configuration based on the sign of the respective residual error (e.g., "+" or "−") and a data sample value (e.g., d[0], which is equal to "0" or "1" (also represented as "+" or "−")).

In some implementations, the plurality of samples 502 includes a current sample, m precursor samples, and k postcursor samples, and the residual error logic 420 generates a total number (e.g., m+k+1) of residual errors 412. Adjustable configuration of a first modulation circuit 350A (e.g., DFE 342, FFE 340, CTLE 336) is adjusted based on the residual errors 412. For example, for each of DFE, FFE, and CTLE adaptation logics 442, 440, or 436, a respective residual error 412 is provided to the respective adaptation logic 442, 440, or 436 to adjust the corresponding adjustable configuration of the first modulation circuit 350A. In some implementations, the adjusted adjustable configuration of the first modulation circuit 350A (e.g., DFE 342) is provided to a distinct adaptation logic 440, 436, or 438 to adjust adjustable configuration of a second modulation circuit 350B (e.g., FFE 340, CTLE 336, or VGA 338). Further, in some implementations, for the second modulation circuit 350B (e.g., FFE 340, CTLE 336, or VGA 338), the adjusted adjustable configuration of the first modulation circuit 350A (e.g., DFE 342) is provided jointly with a respective residual error 412 to the distinct adaptation logic 440, 436, or 438 to adjust the adjustable configuration of the second modulation circuit 350B.

In some implementations, the DFE adaptation logic 442 updates the DFE coefficients $h_0$-$h_d$ based on the residual errors 412. The DFE 342 has a number of (d) DFE taps, and the DFE adaptation logic 442 outputs a DFE control signal 802 corresponding to the updated DFE coefficients $h_0$-$h_d$. The DFE control signal 802 is applied to control the DFE 342 according to the updated DFE coefficient $h_0$-$h_d$. In some situations, the DFE control signal 802 is further provided to one or more of: the FFE adaptation logic 440, the CTLE adaptation logic 436, and the VGA adaptation logic 438. Further, in some implementations, the FFE adaptation logic 440 updates each of the FIR coefficients $C_{-r}$, . . . , $C_0$, . . . , and $C_{+s}$ based on the residual errors 412, the DFE control signal 802, or both. The FFE 340 corresponds to a current sample 502C, r precursor samples 502P and s postcursor samples, where r and s are positive integers. The FFE adaptation logic 440 output an FFE control signal 804 corresponding to the FIR coefficients $C_{-r}$, . . . $C_0$, . . . , and $C_{+s}$. The FFE control signal 804 is applied to control the FFE 340 according to the updated FIR coefficients $C_{-r}$, . . . $C_0$, . . . , and $C_{+s}$. In an example, the FFE control signal 804 is further provided to the CTLE adaptation logic 436. In some implementations, the CTLE adaptation logic 436 updates the CTLE preset selection 806 based on a subset or all of the residual errors 412, the DFE control signal 802, and the FFE control signal 804. In some implementations, the VGA adaptation logic 438 updates the VGA preset selection 808 based on the DFE control signal 802 defining the DFE coefficient $h_0$.

In some implementations, the adaptive equalizer controller 402 includes a concurrent adaptation controller (CAC) 430. The CAC 430 provides programmable parameters (e.g., enable signals, adaptation update rate control) for adaptation logics 410 of the adaptive equalizer controller 402 in accordance with different applications or environments. In accordance with the programmable parameters, the adaptation logics 410 are arranged to facilitate adjusting an adjustable configuration of an adaptation logic (e.g., the second adjustable configuration 506B) based on an adjustable configuration of a distinct adaptation logic (e.g., the first adjustable configuration 506A).

Figure 9:
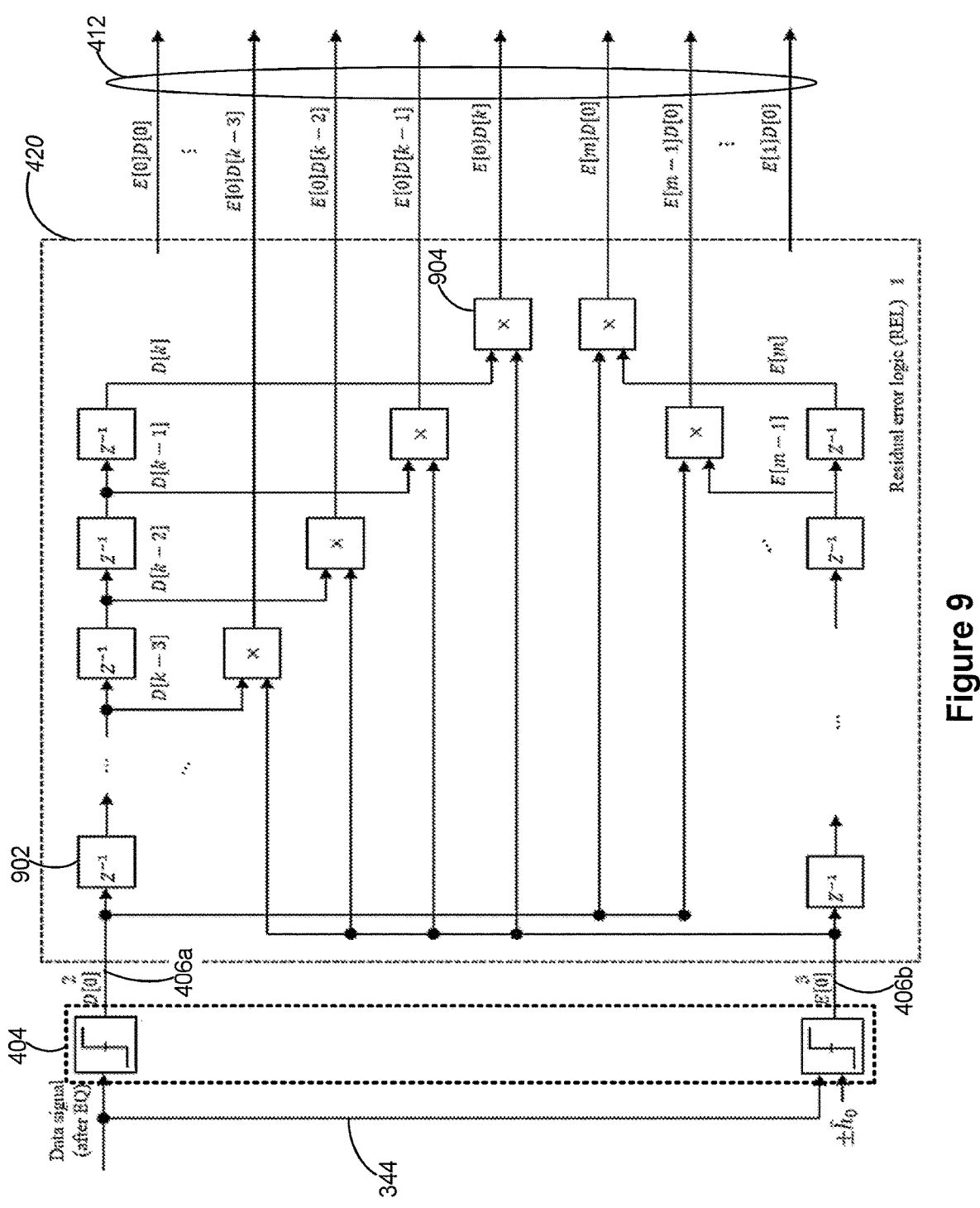
FIG. 9 is a block diagram of a residual error logic coupled to a slicer 404, in accordance with some implementations.

FIG. 9 is a block diagram of a residual error logic 420 coupled to a slicer 404, in accordance with some implementations. The residual error logic 420 includes combinational logics and is configured to determine a plurality of residual errors 412. The residual error logic 420 receives a data signal 406A and an error signal 406B from the slicer 404. The slicer generates the data signal 406A and error signal 406B by comparing the equalized data signal 344 provided by a sequence of modulation circuits 350 with a common mode voltage and a respective voltage level corresponding to a data bit (e.g., "1" or "0", "+" or "−"). Each of the data signal 406A and error signal 406B is delayed by k delay units and m delay units to provide a series of delayed data signals D[0]-D[k] and a series delayed error signals E[0]-E[m], respectively. The series of delayed data signals D[0]-D[k] and the series delayed error signals E[0]-E[m] are combined (e.g., using XOR logic 904) to generate a plurality of residual errors 412. The plurality of residual errors 412 are provided to one or more of: the DFE adaptation logic 442, the FFE adaptation logic 440, and the CTLE adaptation logic 436.

Figure 10:
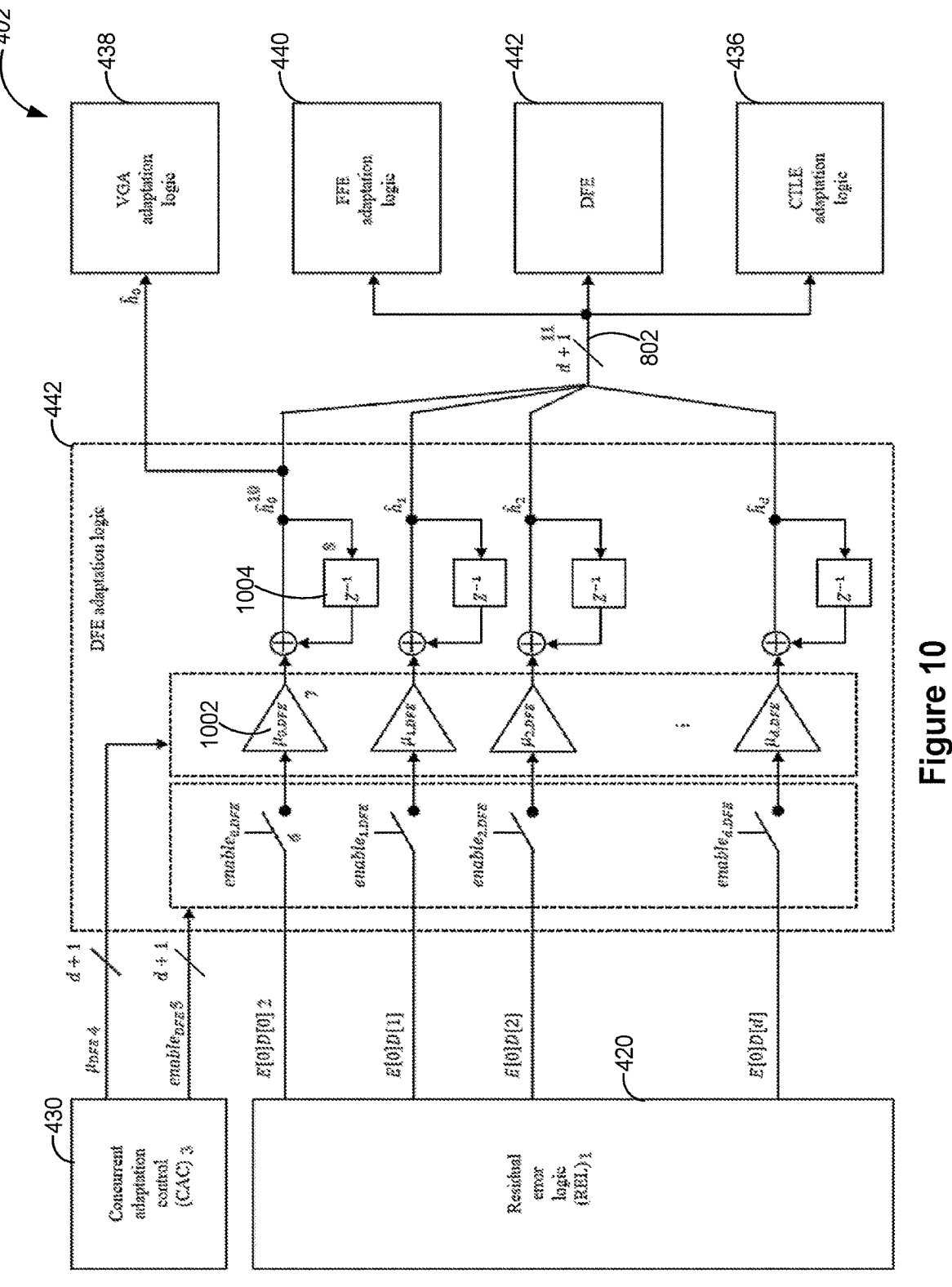
FIG. 10 is a block diagram of an example adaptive equalizer controller, in accordance with some implementations.

FIG. 10 is a block diagram of an example adaptive equalizer controller 402, in accordance with some implementations. The adaptive equalizer controller 402 includes a residual error logic 420, a concurrent adaptation controller 430, and a plurality of adaptation logics 410 including a DFE adaptation logic 442, a VGA adaptation logic 438, an FFE adaptation logic 440, and a CTLE adaptation logic 436. The DFE 342 corresponding to the DFE adaptation logic 442 has d ISI taps, where d is a positive integer. The residual error logic 420 generates a plurality of residual errors 412. Each of a subset of residual errors 412 is a combination of an error signal 406b (E[0]) and a respective delayed data signal 406a (D[i]), and represented by E[0]D[i], where i is equal to 0, 1 ..., and d. The concurrent adaptation controller 430 provides programmable enable (e.g., a plurality of DFE enable signals $enable_{DFE}$) and gai settings (e.g., a plurality of gain value $\mu_{DFE}$). The gain settings control a rate of adaptation. The higher each gain value $\mu_{i,DFE}$, the faster an adaptation rate of a corresponding DFE coefficient $h_i$ despite a higher noise level. In some implementations, each DFE enable signal $enable_{i,DFE}$ controls a respective switch, e.g., enables a connection if the DFE enable signal is "1" and disables the connection if the DFE enable signal is "0".

In some implementations, the DFE adaptation logic 442 is controlled by the plurality of DFE enable signals $enable_{DFE}$ to generate a plurality of DFE coefficients $h_0$-$h_d$. Specifically, in some implementations, for each DFE coefficient $h_i$, the DFE adaptation logic 442 is controlled by a respective DFE enable signals enable; DFE to multiple (1002) a respective residual error signal E[0]D[i] with a respective gain value $\mu_{i,DFE}$ and accumulate a corresponding product by a delayed sum 1004 to generate a respective DFE coefficient $h_i$, where i is equal to 0, 1, . . . , and d. The DFE coefficients $h_0$-$h_d$ form a DFE coefficient array 802.

Further, in some implementations, the FFE adaptation logic 440 is coupled to the concurrent adaptation controller 430 and the DFE adaptation logic 442. The FFE adaptation logic 440 receives the DFE coefficients $h_0$-$h_d$ and updates the FIR coefficients $C_j$, where s≥j≥−r. For postcursor taps (e.g., $C_1$, $C_2$) corresponding to postcursor samples 502Q, the residual error E[0]D[i] is multiplexed with the DFE coefficient $h_i$ to enforce orthogonality. In some implementations, the DFE coefficient $h_i$ is already adapted based on E[0]D[i], and the corresponding FFE coefficient $C_i$ is adjusted based on the DFE coefficient $h_i$, e.g., using a configuration error of the DFE coefficient $h_i$.

In some implementations, the VGA adaptation logic 438 is coupled to the concurrent adaptation controller 430 and the DFE adaptation logic 442. The VGA adaptation logic 438 receives the DFE coefficient $h_0$ and updates the VGA preset select 808. Both the DFE coefficient $h_0$ and the VGA preset select 808 corresponding to the current sample 502C. In some implementations, the DFE coefficient $h_0$ is already adapted based on E[0]D[0], and the corresponding VGA preset select 808 is adjusted based on the DFE coefficient $h_0$, e.g., using a configuration error of the DFE coefficient $h_0$.

FIG. 11 is a flow diagram of an example method 1100 for adapting an electronic device in a data channel, in accordance with some implementations. For convenience, the method 1100 is described as being implemented by the electronic device. The electronic device obtains (1102) an input data signal by the electronic device including a sequence of modulation circuits 350, and each modulation circuit 350 has (1104) one or more adjustable configurations 506. The electronic device processes (1106) the input data signal by the sequence of modulation circuits 350 to generate an output data signal (e.g., an output data signal 406) including a first data sample 502A, and determines (1108) a first residual error 412A of the first data sample 502A. The electronic device adjusts (1110) a first adjustable configuration 506A of a first modulation circuit 350A based on the first residual error 412A, and adjusts (1112) a second adjustable configuration 506B of a second modulation circuit 350B based on the first adjustable configuration 506A.

In some implementations, the electronic device adjusts the second adjustable configuration 506B by determining (1114) a first configuration error 512A of the first adjustable configuration 506A. The second adjustable configuration 506B is adjusted based on the first configuration error 512A of the first adjustable configuration 506A. Further, in some implementations, the electronic device applies (1116) a first scale factor to the first residual error 412A and a second scale factor to the first configuration error 512A and adjusts (1118) the first adjustable configuration 506A of the first modulation circuit 350A and the second adjustable configuration 506B of the second modulation circuit 350B jointly or iteratively based on the first and second scale factors.

In some implementations, the electronic device determines a second residual error 412B of a second data sample 502B of the output data signal. The second data sample 502B is distinct from the first data sample 502A. The second adjustable configuration 506B is adjusted based on the first adjustable configuration 506A and one or more of: the first data sample 502A, the first residual error 412A, the second data sample 502B, and the second residual error 412B of the output data signal. The second data sample 502B is optionally precedes or follows the first data sample 502A.

In some implementations, the second adjustable configuration 506B is adjusted based on the first adjustable configuration 506A and one or more of: the first data sample 502A and the first residual error 412A of the output data signal.

In some implementations, the electronic device adjusts a third adjustable configuration 506C of a third modulation circuit 350C based on the second adjustable configuration 506B.

In some implementations, the electronic device adjusts a fourth adjustable configuration 506D of a fourth modulation circuit 350D based on the output data signal. The second adjustable configuration 506B of the second modulation circuit 350B is adjusted based on both the first adjustable configuration 506A and the fourth adjustable configuration 506D.

In some implementations, the first adjustable configuration 506A of the first modulation circuit 350A and the second adjustable configuration 506B of the second modulation circuit 350B are adjusted dynamically, jointly, or iteratively.

In some implementations, the sequence of modulation circuits 350 includes a continuous time linear equalizer (CTLE) 336, a variable gain amplifier (VGA) 338, a feed-forward equalizer (FFE) 340, and a decision feedback equalizer (DFE) 342. The CTLE 336 has an adjustable CTLE preset $CTLE_S$ identifying one of a plurality of predefined sets of resistances of resistors and capacitances of resistors of the CTLE 336. The VGA 338 has an adjustable gain $G_S$. The FFE 340 has an adjustable FFE preset of FFE coefficients $C_{-r}, \ldots, C_0, \ldots$ and $C_s$. The DFE 342 has an adjustable DFE preset of DFE coefficients $h_0, h_1, \ldots$ and $h_d$. Further, in some implementations, the first modulation circuit 350A includes (1120) the DFE 342, and the first adjustable configuration 506A includes a subset of the adjustable DFE preset of DFE coefficients $h_0, h_1, \ldots$ and $h_d$. The second modulation circuit 350B includes (1122) one of the FFE 340, CTLE 336, and the VGA 338. The second adjustable configuration 506B includes (1124) a corresponding subset of the FFE preset of FFE coefficients $C_{-r}, \ldots$ $C_0, \ldots$ and $C_s$, the CTLE preset $CTLE_S$, and the adjustable gain $G_S$. Alternatively, in some implementations, the second modulation circuit 350B includes the DFE 342, and the second adjustable configuration 506B includes a subset of the adjustable DFE preset of DFE coefficients $h_0, h_1, \ldots$ and $h_d$. The first modulation circuit 350A includes one of the FFE 340, CTLE 336, and the VGA 338, and the first adjustable configuration 506A includes a corresponding subset of the FFE preset of FFE coefficients $C_{-r}, \ldots$ $C_0, \ldots$ and $C_s$, the CTLE preset $CTLE_S$, and the adjustable gain $G_S$. Alternatively, in some implementations, the second modulation circuit 350B includes the DFE 342, and the second adjustable configuration 506B includes a subset of the adjustable DFE preset of DFE coefficients $h_0, h_1, \ldots$ and $h_d$. The first modulation circuit 350A includes two or more of the FFE 340, CTLE 336, and the VGA 338, and the first adjustable configuration 506A includes a combination of two or more of the FFE preset of FFE coefficients $C_{-r}, \ldots, C_0, \ldots$ and $C_s$, the CTLE preset $CTLE_S$, and the adjustable gain $G_S$.

In some implementations, the sequence of modulation circuits 350 includes a DFE 342 and a VGA 338, the VGA 338 having an adjustable gain $G_S$. The DFE 342 has an adjustable DFE preset of DFE coefficients $h_0, h_1, \ldots$ and $h_d$. The first modulation circuit 350A includes the DFE 342, and the first adjustable configuration 506A includes a DFE coefficients $h_0$. The second modulation circuit 350B includes the VGA 338, and the second adjustable configuration 506B includes the adjustable gain $G_S$.

In some implementations, the sequence of modulation circuits 350 includes an FFE 340 and a DFE 342, the FFE 340 having an adjustable FFE preset of FFE coefficients $C_{-r}, \ldots, C_0, \ldots$ and $C_s$. The DFE 342 has an adjustable DFE preset of DFE coefficients $h_0, h_1, \ldots$ and $h_d$. The first modulation circuit 350A includes the DFE 342, and the first adjustable configuration 506A includes a subset of the adjustable DFE preset of DFE coefficients $h_0, h_1, \ldots$ and $h_d$. The second modulation circuit 350B includes the FFE 340, and the second adjustable configuration 506B includes a first subset of the FFE preset of FFE coefficients $C_0, \ldots$ and $C_s$. Further, in some implementations, the electronic device obtains a sequence of successive residual errors that immediately precedes the first residual error. The sequence of successive residual errors corresponds to a sequence of successive data samples that immediately precedes the first data sample. The electronic device adjusts a second subset of the FFE preset of FFE coefficients $C_{-r}, \ldots,$ and $C_{-1}$ based on the sequence of successive residual errors and the first data sample.

In some implementations, the sequence of modulation circuits 350 includes a CTLE 336 and a DFE 342, the CTLE 336 having an adjustable CTLE preset $CTLE_S$, the DFE 342 having an adjustable DFE preset of DFE coefficients $h_0, h_1, \ldots$ and $h_d$. The first modulation circuit 350A includes the DFE 342, and the first adjustable configuration 506A includes a subset of the adjustable DFE preset of DFE coefficients $h_1, \ldots$ and $h_d$. The second modulation circuit 350B includes one of the CTLE 336, and the second adjustable configuration 506B includes the CTLE preset $CTLE_S$.

In some implementations, the sequence of modulation circuits 350 includes a DFE 342 having an adjustable DFE preset of DFE coefficients $h_0, h_1, \ldots$ and $h_d$. The output data signal includes a sequence of successive data samples that starts with the first data sample, and every two successive data samples are delayed from each other by a unity delay. The electronic device adjusts the first adjustable configuration 506A of the first modulation circuit 350A further by adjusting an i-th DFE coefficients $h_i$ based on an (i+1)-th data sample of the sequence of successive data samples and the first residual error, where i is an integer equal to or greater than 0.

In some implementations, the first residual error 412A of the first data sample 502A includes a sign (e.g., "+" and "−") of the first residual error 412A, and the first adjustable configuration 506A of the first modulation circuit 350A is determined based on the sign of the first residual error 412A and a value (e.g., "1" and "0", which are represented as "+" or "−") of a second data sample 502B. The second data sample 502B is optionally identical to or distinct from the first data sample 502A. In an example, a DFE coefficient $h_1$ of the DFE 342 is adjusted based on the sign of a residual error of a postcursor sample 502Q (h[1]) and a value (e.g., "1" and "0", "+" or "−") of the current sample 502C.

It should be understood that the particular order in which the operations in FIG. 11 has been described are merely exemplary and are not intended to indicate that the described order is the only order in which the operations could be performed. One of ordinary skill in the art would recognize various ways to controlling clock data recovery for a data communication channel. Additionally, it should be noted that details of other processes and structures described above with respect to FIGS. 1-10 are also applicable in an analogous manner to method 1100 described above with respect to FIG. 11. For brevity, these details are not repeated here.

In some implementations, method 1100 is, optionally, governed by instructions that are stored in a non-transitory computer readable storage medium and that are executed by one or more processors of the electronic device. Each of the operations shown in FIG. 11 may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 1100 may be combined and/or the order of some operations may be changed.

It will also be understood that, although the terms first, second, etc. are, in some instances, used herein to describe various elements, these elements should not be limited by these terms. These terms are only used to distinguish one element from another. For example, a first electronic device can be termed a second electronic device, and, similarly, a second electronic device can be termed a first electronic device, without departing from the scope of the various described implementations. The first electronic device and the second electronic device are both electronic device, but they are not the same electronic device.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

The above description, for purpose of explanation, has been described with reference to specific implementations.

However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method for adapting an electronic device, comprising:

obtaining an input data signal by a sequence of modulation circuits, each modulation circuit of the sequence of modulation circuits having one or more adjustable configurations;

processing the input data signal by the sequence of modulation circuits to generate an output data signal including a first data sample;

determining a first residual error of the first data sample, via residual error logic;

adjusting a first adjustable configuration of a first modulation circuit of the sequence of modulation circuits based on the first residual error, via a first adaptation logic circuit; and adjusting a second adjustable configuration of a second modulation circuit of the sequence of modulation circuits based on the first adjustable configuration, via a second adaptation logic circuit;

wherein the first residual error of the first data sample includes a sign of the first residual error, and the first adjustable configuration of the first modulation circuit is determined based on the sign of the first residual error and a value of a second data sample.

2. The method of claim 1, adjusting the second adjustable configuration further comprising:

determining a first configuration error of the first adjustable configuration, wherein the second adjustable configuration is adjusted based on the first configuration error of the first adjustable configuration.

3. The method of claim 2, further comprising:

applying a first scale factor to the first residual error and a second scale factor to the first configuration error; and the first adjustable configuration of the first modulation circuit and the second adjustable configuration of the second modulation circuit are adjusted jointly or iteratively based on the first and second scale factors.

4. The method of claim 1, further comprising:

determining a second residual error of the second data sample of the output data signal, the second data sample distinct from the first data sample;

wherein the second adjustable configuration is adjusted based on the first adjustable configuration and one or more of: the first data sample, the first residual error, the second data sample, and the second residual error of the output data signal.

5. The method of claim 1, wherein the second adjustable configuration is adjusted based on the first adjustable configuration and one or more of: the first data sample and the first residual error of the output data signal.

6. The method of claim 1, further comprising adjusting a third adjustable configuration of a third modulation circuit based on the second adjustable configuration.

7. The method of claim 1, further comprising:

adjusting a fourth adjustable configuration of a fourth modulation circuit based on the output data signal;

wherein the second adjustable configuration of the second modulation circuit is adjusted based on both the first adjustable configuration and the fourth adjustable configuration.

8. The method of claim 1, wherein the first adjustable configuration of the first modulation circuit and the second adjustable configuration of the second modulation circuit are adjusted dynamically, jointly, or iteratively.

9. An electronic device, comprising:

a sequence of modulation circuits configured to obtain an input data signal and process the input data signal to generate an output data signal including a first data sample, each modulation circuit having one or more adjustable configurations;

an adaptive equalizer controller coupled to the sequence of modulation circuits, wherein the adaptive equalizer controller is configured for:

determining a first residual error of the first data sample, via residual error logic;

adjusting a first adjustable configuration of a first modulation circuit of the sequence of modulation circuits based on the first residual error, via a first adaptation logic circuit; and adjusting a second adjustable configuration of a second modulation circuit of the sequence of modulation circuits based on the first adjustable configuration, via a second adaptation logic circuit;

wherein the first residual error of the first data sample includes a sign of the first residual error, and the first adjustable configuration of the first modulation circuit is determined based on the sign of the first residual error and a value of a second data sample.

10. The electronic device of claim 9, wherein:

the sequence of modulation circuits includes a continuous time linear equalizer (CTLE), a variable gain amplifier (VGA), a feed-forward equalizer (FFE), and a decision feedback equalizer (DFE);

the CTLE has an adjustable CTLE preset $CTLE_S$ identifying one of a plurality of predefined sets of resistances of resistors and capacitances of resistors of the CTLE;

the VGA has an adjustable gain $G_S$;

the FFE has an adjustable FFE preset of FFE coefficients $C_{-r}, \ldots C_0, \ldots,$ and $C_s$;

the DFE has an adjustable DFE preset of DFE coefficients $h_0, h_1, \ldots$ and $h_d$.

11. The electronic device of claim 10, wherein:

the first modulation circuit includes the DFE, and the first adjustable configuration includes a subset of the adjustable DFE preset of DFE coefficients $h_0, h_1, \ldots$ and $h_d$;

the second modulation circuit includes one of the FFE, CTLE, and the VGA; and the second adjustable configuration includes a corresponding subset of the FFE preset of FFE coefficients $C_{-r}, \ldots C_0, \ldots,$ and $C_s$, the CTLE preset $CTLE_S$, and the adjustable gain $G_S$.

12. The electronic device of claim 10, wherein:

the second modulation circuit includes the DFE, and the second adjustable configuration includes a subset of the adjustable DFE preset of DFE coefficients $h_0, h_1, \ldots$ and $h_d$; and the first modulation circuit includes one of the FFE, CTLE, and the VGA, and the first adjustable configuration includes a corresponding subset of the FFE preset of FFE coefficients $C_{-r}, \ldots C_0, \ldots,$ and $C_s$, the CTLE preset $CTLE_S$, and the adjustable gain $G_S$.

13. The electronic device of claim 10, wherein:

the second modulation circuit includes the DFE, and the second adjustable configuration includes a subset of the adjustable DFE preset of DFE coefficients $h_0, h_1, \ldots$ and $h_d$; and the first modulation circuit includes two or more of the FFE, CTLE, and the VGA, and the first adjustable configuration includes a combination of two or more of the FFE preset of FFE coefficients $C_{-r}, \ldots C_0, \ldots,$ and $C_s$, the CTLE preset $CTLE_S$, and the adjustable gain $G_S$.

14. The electronic device of claim 9, wherein the first adjustable configuration of the first modulation circuit and the second adjustable configuration of the second modulation circuit are adjusted dynamically, jointly, or iteratively.

15. A data interface device, comprising:

a sequence of modulation circuits configured to obtain an input data signal and process the input data signal to generate an output data signal including a first data sample, each of the sequence of modulation circuits having one or more adjustable configurations;

an adaptive equalizer controller coupled to the sequence of modulation circuits, wherein the adaptive equalizer controller is configured for:

determining a first residual error of the first data sample, via residual error logic;

adjusting a first adjustable configuration of a first modulation circuit of the sequence of modulation circuits based on the first residual error, via a first adaptation logic circuit; and adjusting a second adjustable configuration of a second modulation circuit of the sequence of modulation circuits based on the first adjustable configuration, via a second adaptation logic circuit:

wherein the first residual error of the first data sample includes a sign of the first residual error, and the first adjustable configuration of the first modulation circuit is determined based on the sign of the first residual error and a value of a second data sample.

16. The data interface device of claim 15, wherein:

the sequence of modulation circuits includes a DFE and a VGA, the VGA having an adjustable gain $G_S$, the DFE having an adjustable DFE preset of DFE coefficients $h_0, h_1, \ldots$ and $h_d$;

the first modulation circuit includes the DFE, and the first adjustable configuration includes a DFE coefficients $h_0$; and the second modulation circuit includes the VGA, and the second adjustable configuration includes the adjustable gain $G_S$.

17. The data interface device of claim 15, wherein:

the sequence of modulation circuits includes an FFE and a DFE, the FFE having an adjustable FFE preset of FFE coefficients $C_{-r}, \ldots C_0, \ldots,$ and $C_s$, the DFE having an adjustable DFE preset of DFE coefficients $h_0, h_1, \ldots$ and $h_d$;

the first modulation circuit includes the DFE, and the first adjustable configuration includes a subset of the adjustable DFE preset of DFE coefficients $h_0, h_1, \ldots$ and $h_d$;

the second modulation circuit includes the FFE, and the second adjustable configuration includes a first subset of the FFE preset of FFE coefficients $C_0, \ldots,$ and $C_s$.

18. The data interface device of claim 17, further comprising:

obtaining a sequence of successive residual errors that immediately precedes the first residual error, the sequence of successive residual errors corresponding to a sequence of successive data samples that immediately precedes the first data sample; and adjusting a second subset of the FFE preset of FFE coefficients $C_{-r}, \ldots,$ and $C_{-1}$ based on the sequence of successive residual errors and the first data sample.

19. The data interface device of claim 15, wherein:

the sequence of modulation circuits includes a CTLE and a DFE, the CTLE having an adjustable CTLE preset $CTLE_S$, the DFE having an adjustable DFE preset of DFE coefficients $h_0$, $h_1$, . . . and $h_d$;

the first modulation circuit includes the DFE, and the first adjustable configuration includes a subset of the adjustable DFE preset of DFE coefficients $h_1$, . . . and $h_d$; and the second modulation circuit includes one of the CTLE, and the second adjustable configuration includes the CTLE preset $CTLE_S$.

20. The data interface device of claim 15, wherein:

the sequence of modulation circuits includes a DFE having an adjustable DFE preset of DFE coefficients $h_0$, $h_1$, . . . and $h_d$;

the output data signal includes a sequence of successive data samples that starts with the first data sample, and every two successive data samples are delayed from each other by a unity delay; and adjusting the first adjustable configuration of the first modulation circuit further comprises adjusting an i-th DFE coefficients $h_i$ based on an (i+1)-th data sample of the sequence of successive data samples and the first residual error, where i is an integer equal to or greater than 0.

\* \* \* \* \*